(12) United States Patent
Sepulveda

(10) Patent No.: US 7,236,170 B2
(45) Date of Patent: Jun. 26, 2007

(54) WRAP DEFORMATION USING SUBDIVISION SURFACES

(75) Inventor: Miguel A. Sepulveda, Los Angeles, CA (US)

(73) Assignee: DreamWorks LLC, Glendale, CA (US)

( * ) Notice: Subject to any disclaimer, the term of this patent is extended or adjusted under 35 U.S.C. 154(b) by 157 days.

(21) Appl. No.: 10/769,154

(22) Filed: Jan. 29, 2004

(65) Prior Publication Data

US 2005/0168463 A1     Aug. 4, 2005

(51) Int. Cl.
*G06T 17/40* (2006.01)
(52) U.S. Cl. .................. 345/423; 345/646; 345/647; 345/473
(58) Field of Classification Search ........... 345/419, 345/420, 427, 428, 581, 423, 646, 647, 473
See application file for complete search history.

(56) References Cited

U.S. PATENT DOCUMENTS

| | | | |
|---|---|---|---|
| 6,061,067 A | 5/2000 | Silva et al. | |
| 6,222,553 B1 | 4/2001 | DeRose et al. | |
| 6,236,403 B1 * | 5/2001 | Chaki et al. | 345/420 |
| 6,300,960 B1 | 10/2001 | DeRose et al. | |
| 6,489,960 B2 | 12/2002 | DeRose et al. | |
| 6,535,215 B1 | 3/2003 | DeWitt | |
| 6,538,651 B1 * | 3/2003 | Hayman et al. | 345/419 |
| 6,573,890 B1 | 6/2003 | Lengyel | |
| 6,608,631 B1 * | 8/2003 | Milliron | 345/647 |
| 2004/0001064 A1 | 1/2004 | Boyd et al. | |
| 2005/0057569 A1 | 3/2005 | Berger | |

OTHER PUBLICATIONS

Milliron et al. "A Framework for Geometric Wraps and Deformations", ACM, 2002, pp. 21-51.*
MacCracken, Ron, et al., "Free-Form Deformations With Lattices of Arbitrary Topology", Proceedings of the 23rd International Conference on Computer Graphics and Interactive Techniques, 1996, pp. 181-190.
Guibas, Leonidas, et al., "Primitives for the Manipulation of General Subdivisions and the Computation of Voronoi Diagrams," ACM Transactions on Graphics, vol. 4, No. 2, Apr. 1985, pp. 74-123.
Loop, Charles Teorell, "Smooth Subdivision Surfaces Based on Triangles", Master's thesis, Department of Mathematics, The University of Utah, Aug. 1987, pp. 1-60.
Biermann, Henning, et al., "Piecewise Smooth Subdivision Surfaces With Normal Control", Proceedings of the 27th International Conference on Computer Graphics and Interactive Techniques, New Orleans, Louisiana, 2000, pp. 113-120.
Lee, Aaron, et al., "Displaced Subdivision Surfaces", Proceedings of the 27th International Conference on Computer Graphics and Interactive Techniques, New Orleans, Louisiana, 2000, pp. 85-94.

(Continued)

*Primary Examiner*—Kimbinh T. Nguyen
(74) *Attorney, Agent, or Firm*—Morrison & Foerster LLP

(57) ABSTRACT

Deformations are applied to a model using a subdivision surface. Given a wrap and model, a subdivision surface is calculated from the wrap. The model is then bound to the subdivision surface. When the wrap is deformed, the subdivision surface is recalculated. The model is then deformed based on changes in the subdivision surface. Binding parameters may be assigned to control vertices in the wrap to control the application of the deformation to the surface.

28 Claims, 20 Drawing Sheets

OTHER PUBLICATIONS

Zorin, Denis, et al., "Course 23: Subdivision for Modeling and Animation at the 27th International Conference on Computer Graphics and Interactive Techniques," New Orleans, Louisiana, 2000.

Catmull, E. et al., "Recursively Generated B-Spline Surfaces on Arbitrary Topological Meshes", Computer Aided Design, 10(6), pp. 350-355, Nov. 1978.

Chua, C. et al., "A layered approach to deformable modeling and animation", Computer Animation, 2001. The Fourteenth Conference on Computer Animation Proceedings, Nov. 7-8, 2001, Piscataway, New Jersey pp. 184-191.

Claes, J et al., "Turning the approximating catmull-clark subdivision scheme into a locally interpolating surface modeling tool", Shape Modeling and Applications, SMI 2001 International Conference On., May 7-11, 2001, Piscataway, NJ, pp. 42-48.

Feng, J. et al., "Multiresolution free-form deformation with subdivision surface of arbitrary topology", The Visual Computer, Jan. 31, 2006, vol. 22, No. 1, pp. 28-42.

Hua, J et al., "Free-Form Deformations Via Sketching and Manipulating Scalar Fields", Proceedings of the 8th ACM Symposium on Solid Modeling and Applications, Jun. 16-20, 2003, Seattle, WA, pp. 328-333.

Lee, S., "Interactive Multiresolution Editing of Arbitrary Meshes", Computer Graphics Forum, Amsterdam, Netherlands, Sep. 7, 1999, vol. 18, No. 3, pp. C73-C82, C402.

European Search Report mailed Jun. 20, 2006, for European patent application No. 04257965, Filed Dec. 20, 2004.

European Search Report mailed Jul. 6, 2005, for European application No. EP 05252035 filed Mar. 31, 2005, 4 pages.

European Search Report mailed Jun. 20, 2006, for European application No. EP 04257969 filed Dec. 20, 2004, 4 pages.

Forsey, D. R. et al. (1995). "Surface Filling with Hierarchical Splines," *ACM Transactions on Graphics* 14(2): 134-161.

Gagvani, Nikhil et al. (1998) "Volume Animation using the Skeleton Tree," Proceedings of the 1998 IEEE Symposium on Volume Visualization, Research Triangle Park, NC, USA, Oct. 19-20, 1998, pp. 47-53.

Preda, Marius et al. (2002) "Critic Review on MPEG-4 Face and Body Animation," Prodeedings of the 2002 International Conference on Image Processing, Rochester, NY, USA, Sep. 22-25, 2002, pp. 505-508.

Preda, Marius et al. (2002) "Insights into low-level avatar animation and MPEG-4 standardization," Signal Processing: Image Communication, 17: 717-741.

* cited by examiner

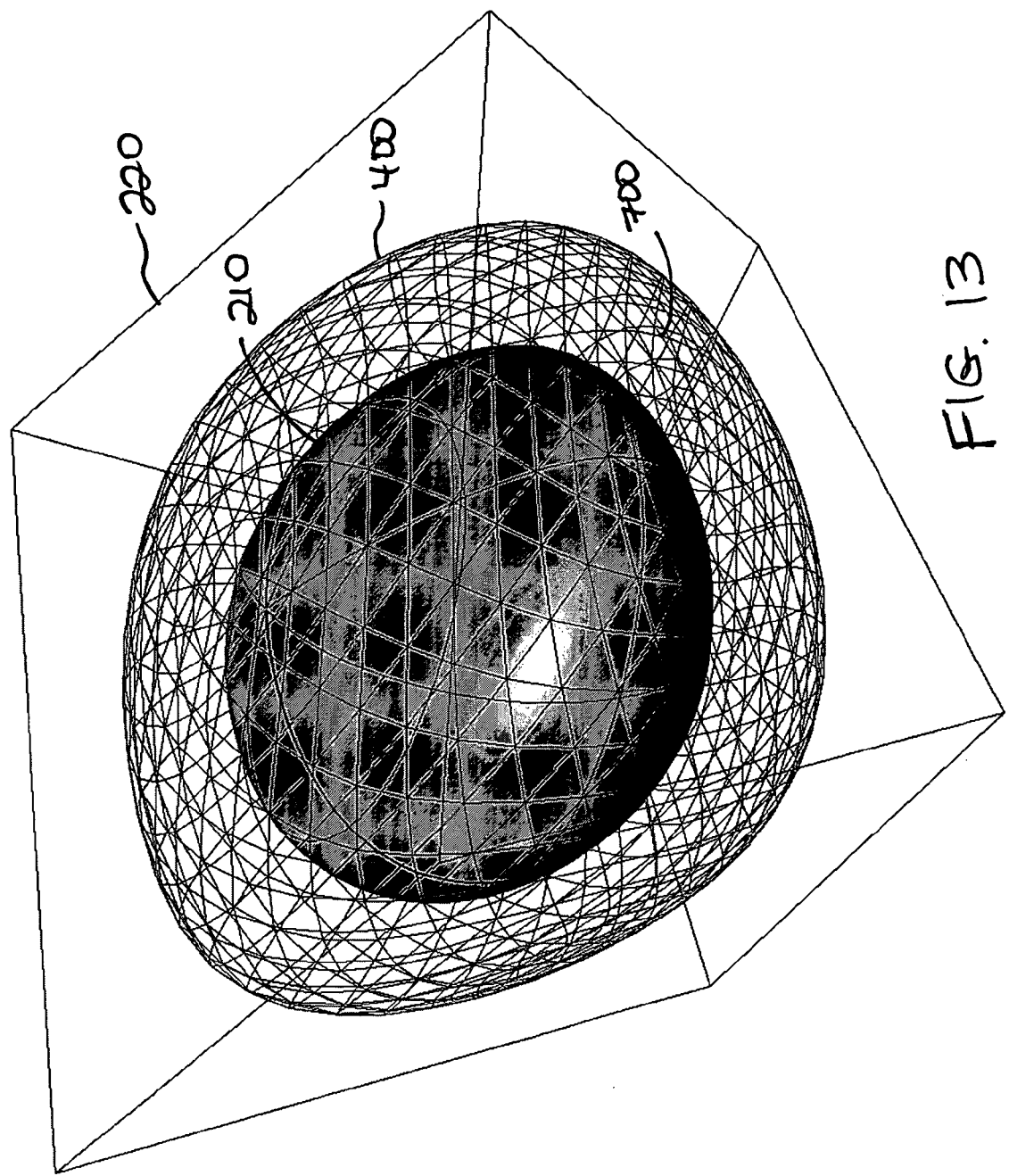

WRAP DEFORMATION USING SUBDIVISION SURFACES

BACKGROUND OF THE INVENTION

1. Field of the Invention

This invention relates generally to computer graphics and, more specifically, to wrap deforming a model using subdivision surfaces.

2. Background Art

Computers are widely used to model figures, from insects and monsters to human beings. The basic view of a figure is known as a model. Creating a model requires a lot of time and effort on the part of a user. In general, a user creates a model by scanning in a three-dimensional sculpture or by creating a model by hand based on a traditional two-dimensional drawing. Frequently, a computer-generated (CG) model is represented mathematically by one or more parametric surfaces. A CG model usually comprises a large number of parametric surfaces connected together. A parametric surface is a description of a two-dimensional object in three-dimensional space where every point on the parametric surface can be mapped to a pair of parameters (u, v). Many types of parametric surfaces are used in CG modeling, such as NURBS (Non-Uniform Rational B-Splines) surfaces and subdivision surfaces (the latter having a non-trivial parameterization).

A parametric surface has a set of control points (also known as control vertices or "CVs") that define the shape of the surface. When a CV is moved, the surface that is defined by the CV deforms into a new shape. Thus, a user can change the shape of a model by moving the CVs that define the model's surfaces. In order to deform a model to a particular shape, a user often must move a large number of CVs, due to the natural constraints of parametric surfaces. Moving large numbers of CVs directly, one by one, is time-consuming and not very intuitive. Instead, users manipulate CVs programmatically through the use of a deformation algorithm ("deformer"). A deformer enables an animator to move CVs indirectly by using a simpler interface.

Many types of deformers exist such as, for example, blendshapes, clusters, and free-form deformers. Free-form deformers partition space into discrete cells. One type of free-form deformer, a lattice, comprises surrounding a model with a polygonal cubic mesh that is partitioned into a relatively large number of divisions in x, y, and z (hence the name "lattice"). The lattice surrounds the model in such a way that each of the model's CVs falls inside one cell of the lattice. As the user moves the vertices of the lattice, the cells of the lattice are deformed, and the CVs located inside the cells get transformed according to a local affine transformation, eventually placing the CVs in new locations. In this way, a relatively low-resolution lattice can be used to create broad deformation on a high-resolution model.

Another type of free-form deformer, a wrap deformer, is similar to a lattice but uses an arbitrary polygonal mesh of free topology rather than a lattice mesh. The polygonal mesh, also known as a polywrap, wrap, or cage, acts as a binding domain for the model, such that the model is bound to the wrap. This binding transmits deformations of the wrap's vertices to the CVs of the model, thereby deforming the model itself. Deformations of the wrap's vertices can affect the model's CVs in a variety of ways. One family of wrap deformers creates small cells in the space surrounded by the wrap and associates the cells with the CVs of a model. The problem with this type of wrap deformer is that it doesn't scale well with the size of the model. Large models at high resolution may require a huge number of cells, and the evaluation and update process of the deformer is very slow and consumes a lot of memory. Conversely, using a smaller number of cells will introduce discretization artifacts in the model during deformation. This type of wrap deformer is further described in "Free-form Deformations with Lattices of Arbitrary Topology" by R. MacCracken and K. Joy, Proceedings of the $23^{rd}$ International Conference on Computer Graphics and Interactive Techniques, 1996, pp. 181-190.

Another family of wrap deformers associates the CVs of a model with certain CVs on the wrap. The motion of the model's CVs is then defined as a weighted linear combination of the motions of the wrap's CVs. This approach is faster than the space cell division approach mentioned above; however, it suffers from many problems and artifacts due to the simplistic nature of the linear interpolation scheme.

A wrap can be located either inside or outside of a model. When a wrap is located inside a model, it acts like a skeleton. As the underlying skeleton changes, the outer layer (the model) changes also. When a wrap is located outside of a model, it acts like a puppeteer with strings connecting the wrap to the model. As the wrap is deformed, the strings pull on the model and thereby deform the model.

In order to animate a model, it is necessary to create additional images that show the model in various poses corresponding to stages of a movement. Each of these images is identical to the model except for slight differences. For example, the model may have its mouth closed, while additional images show the model's mouth opening over time. Many images must be created in order to animate a detailed model. Creating each image by manually editing each CV of the model is nearly impossible. Not only does it require a great deal of work, it also does not result in a convincing performance for the animated model because of the awkwardness of the interface.

Instead, animators use software "rigs" to pose models as if they were puppets. A rig is a set of joints, skeletons, and deformers that attach to a model. Rigs provide the "machinery" that enables users to animate models. A rig comprises computer modules and interfaces that enable an animator to move the CVs of the model indirectly, via a much simpler interface. For example, a rig enables an animator to select a part of a model, such as an eyebrow or a lip, and use simple user interface widgets, such as buttons and sliders, to move that part of the model.

Existing wrap deformation software, such as Maya® from Alias Systems and SOFTIMAGE®|3D from Avid Technology, Inc., has several disadvantages. One disadvantage is that deformations of the wrap result in excessive linear interpolation artifacts in the model. The changes made to the wrap are often discontinuous due to the wrap's lack of resolution, and these discontinuities end up getting transferred to the model. These artifacts are most noticeable when there is a significant difference between the resolution of the wrap and the resolution of the model. This situation is common because wraps are usually low-resolution (not continuous), whereas models are usually high-resolution (continuous). FIG. 1 shows an example of discontinuities created by wrap deforming a model using prior art software. Here, the wrap 100 is a low-resolution polygonal mesh and the model 110 is a higher-resolution NURBS (Non-Uniform Rational B-Splines) plane. FIG. 1 shows the effect on the model 110 of raising the second row of control vertices in the wrap 100. The artifacts indicate problems with the cell splitting of the polygonal mesh wrap and problems with the weighted contributions of the wrap on the control vertices of the model.

Another disadvantage of prior art software is that it is slow. The slowness is severe enough to make wrap deformation inadequate for character setup purposes. For example, it cannot be used for sculpting new blendshapes from existing models, unless the models are very small and not detailed. When existing software is used to wrap deform a detailed, realistic model, it runs so slowly that it is virtually unusable for modeling and animation. Since free-form deformers partition space into discrete cells, the calculations they perform require $O(n^3)$ time, where n is the number of cells.

What is needed is a way to wrap deform a model that results in fewer discontinuities and artifacts and is fast enough to be used for modeling realistic characters and animating characters using rigs.

SUMMARY OF THE INVENTION

The present invention overcomes the limitations of the prior art by using a subdivision surface as a binding domain to wrap deform a model. A subdivision surface is derived from a wrap that has been associated with a model. The subdivision surface is bound to the model by associating points on the subdivision surface with control vertices of the model. In response to a change in the position of a control vertex of the wrap, the subdivision surface is redetermined, and the updated surface locations are used to redetermine the position of the model's control vertices, thereby deforming the model.

In one embodiment, the model and wrap are input into a software component called a polywrap deformation engine. The deformation engine creates a subdivision surface based on the wrap. The deformation engine then binds the model to the subdivision surface. When the wrap is deformed, the subdivision surface is recalculated. The model is then deformed based on the recalculated subdivision surface and the binding between the subdivision surface and the model.

Using the polywrap deformation engine to wrap deform a model minimizes the introduction of linear artifacts during the deformation process. This is because the model and the subdivision surface to which it is bound have similar resolutions. The deformation engine can also be used with binding parameters assigned to control vertices in the wrap. The values of these parameters are propagated to the subdivision surface and affect the deformation of the model. Thus, usage of a subdivision surface enables both positional continuity and continuity in values of binding parameters.

The present invention may be embodied in various forms. In one embodiment, the present invention is a computer-implemented methodology for deforming a model using subdivision surfaces. Another embodiment provides a software architecture; yet another embodiment is a computer system which performs the subdivision method. Another aspect of the invention is the data representation of a model in combination with subdivision surfaces as stored in a computer-readable medium. The present invention also has embodiments as computer program products for carrying out the subdivision method.

BRIEF DESCRIPTION OF THE DRAWINGS

FIG. 13 illustrates the polygonal cube mesh, the NURBS sphere model, and the cube mesh's subdivision mesh of FIG. 8 after deformation of the polygonal cube mesh.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTIONS OF THE PREFERRED EMBODIMENTS

Figure 1:
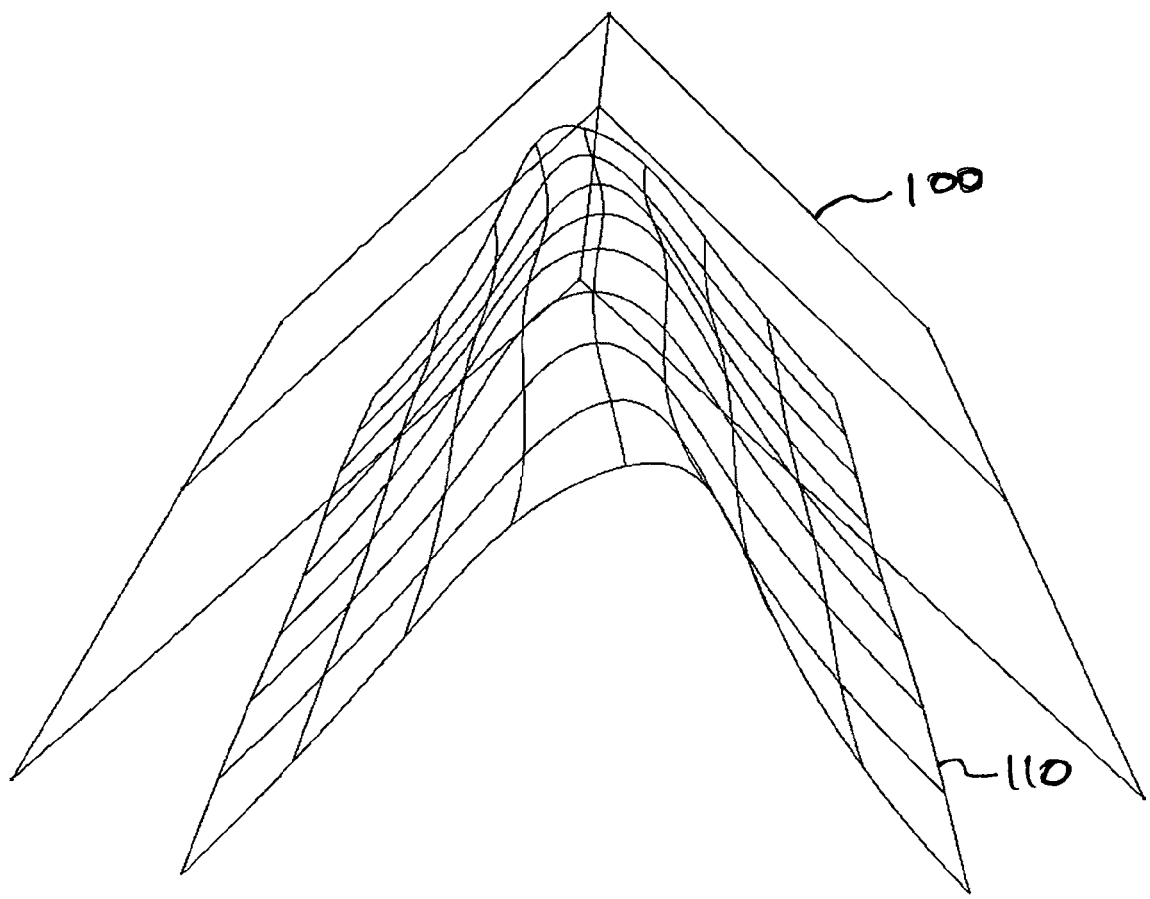
FIG. 1 shows an example of discontinuities created by wrap deforming a model using prior art software.
Figure 2:
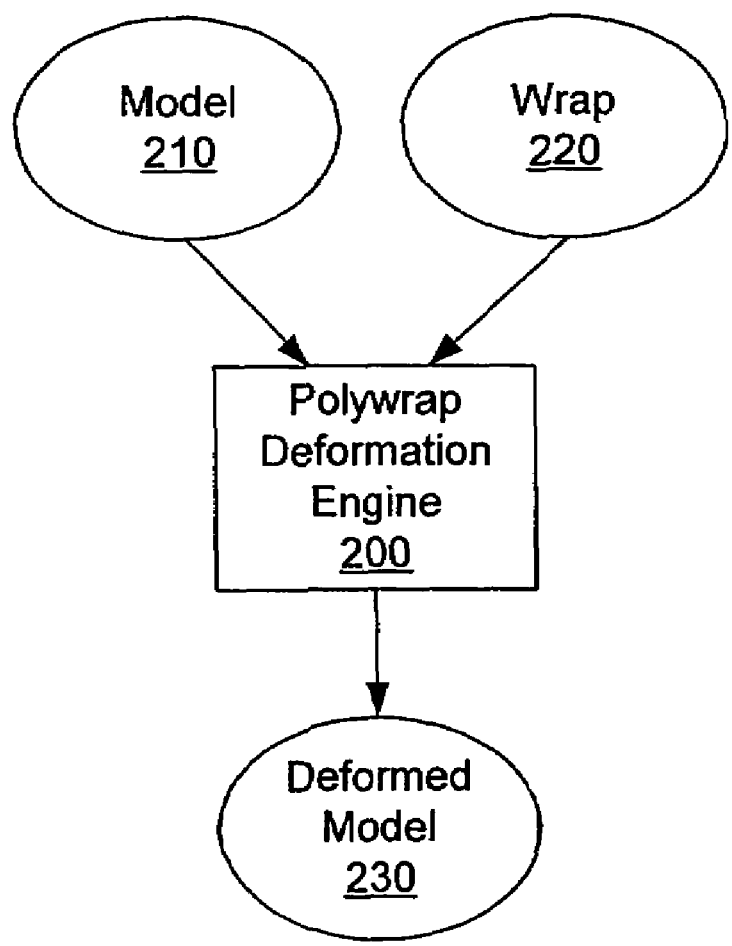
FIG. 2 illustrates a block diagram overview of the use of one embodiment of a software component for wrap deforming a model.

FIG. 2 illustrates a block diagram overview of the use of one embodiment of a software component for wrap deforming a model. FIG. 2 includes a polywrap deformation engine 200, a model 210, a wrap 220, and a deformed model 230. Polywrap deformation engine 200 is a software component used to wrap deform a model 210. The inputs of the deformation engine 200 are a model 210 and a wrap 220. The output of the deformation engine 200 is a deformed model 230. After a user is satisfied with the deformed model 230, the deformed model 230 is further processed in order to add special effects such as lighting and shadows. For example, the deformed model 230 may be input into a rendering engine (not shown).

One of the inputs to polywrap deformation engine 200 is a model 210. The model 210 is the figure that will be deformed. The model 210 may be built using a variety of methods known to those skilled in the art, such as scanning in a three-dimensional sculpture or creating a model from scratch based on a traditional two-dimensional drawing using a computer graphics product such as Maya® from Alias Systems. The model 210 may be, for example, a NURBS (Non-Uniform Rational B-Splines) surface, a subdivision surface, a curve, a polygonal mesh, or a combination of the above.

The other input to the polywrap deformation engine 200 is a wrap 220. The wrap 220 is used to deform the model 210. The wrap 220 may be built using a variety of methods known to those skilled in the art, such as scanning in a model or creating a wrap from scratch using a computer graphics product such as Maya® from Alias Systems. Preferably, the wrap 220 is a polygonal mesh.

Figure 3:
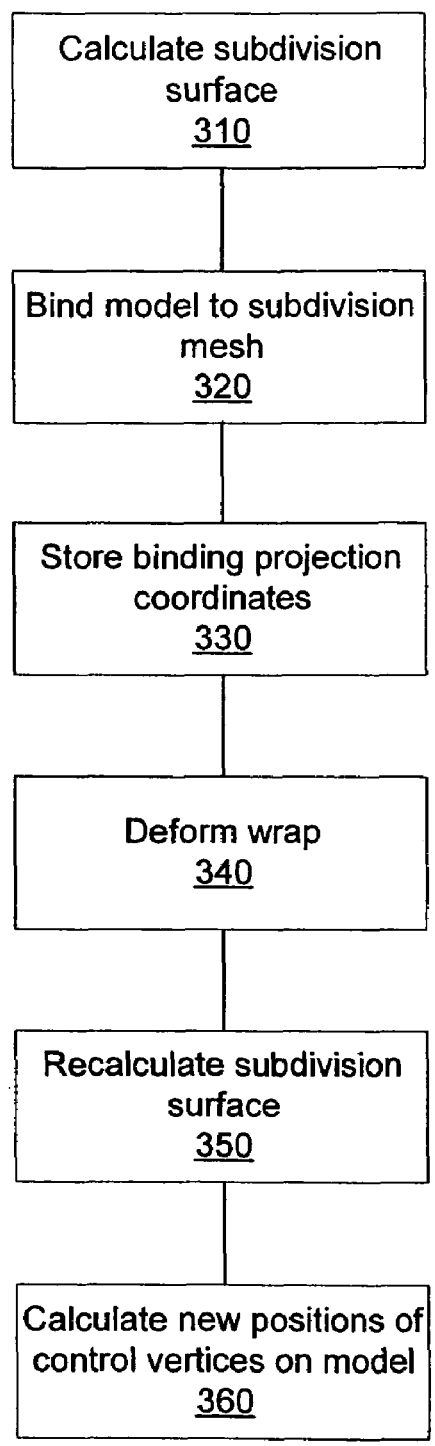
FIG. 3 illustrates a flowchart of a method for wrap deforming a model according to one embodiment of the invention.

FIG. 3 illustrates a flowchart of a method for wrap deforming a model according to one embodiment of the invention. Polywrap deformation engine 200 performs wrap deformation using a subdivision surface. A subdivision surface is a high-resolution surface calculated based on a polygonal mesh of arbitrary topology. The lower-resolution mesh is iteratively subdivided and refined until it becomes a high-resolution surface. Examples of this process will be discussed below. Subdivision surfaces are $C^2$ continuous (i.e., their second derivatives are continuous) in the limit of infinite refinement (i.e., after an infinite number of subdivisions). The "subdivision surface" that is bound to the model 210 in this embodiment, which is called the "subdivision mesh," is a finite resolution representation of the limit surface. Although the subdivision mesh is of finite resolution, the points within it are located within the limit subdivision surface. Subdivision surfaces are further described in handouts distributed at Course 23: Subdivision for Modeling and Animation at the 27$^{th}$ International Conference on Computer Graphics and Interactive Techniques, New Orleans, La., 2000.

Figure 4A:
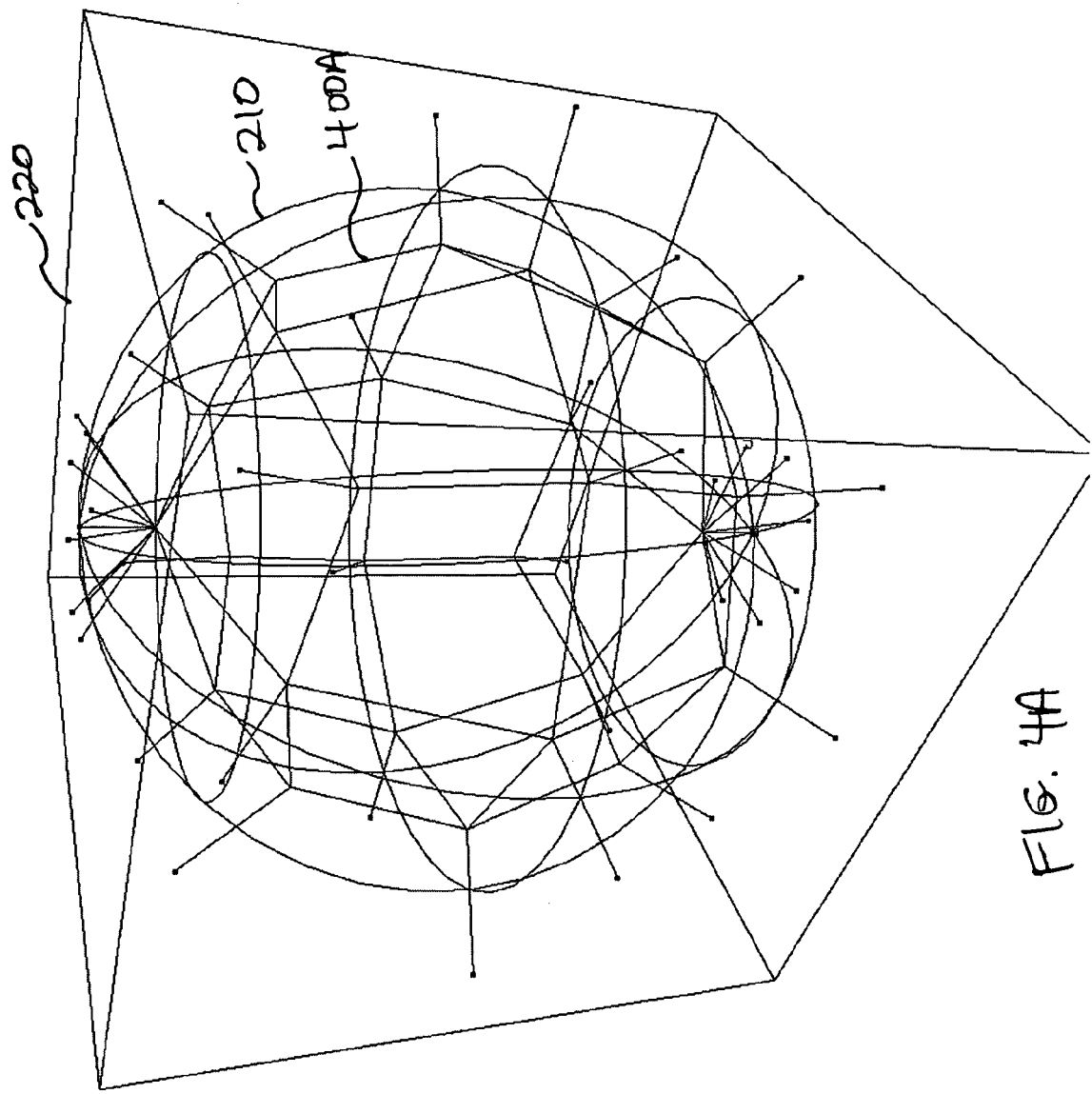
FIGS. 4A and 4B illustrate the effect of the value of the subdivision level parameter.
Figure 4B:
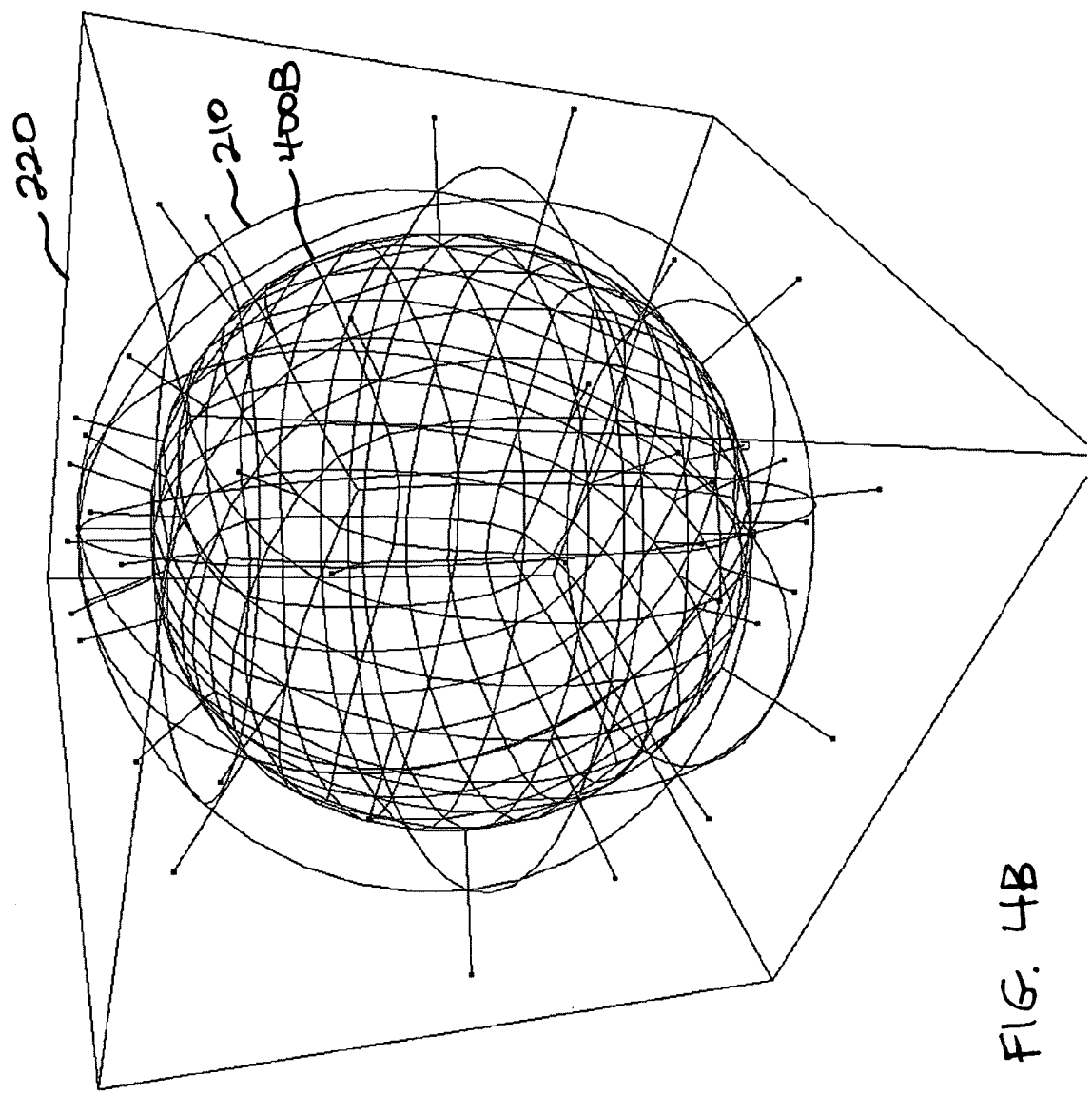

How well the subdivision mesh approximates the limit subdivision surface depends on how many times the mesh has been subdivided. Each time the mesh gets subdivided, the resolution of its surface increases. In the limit, the resolution approaches that of a subdivision surface. In one embodiment, the user may control the number of division refinements applied to the initial wrap 220 by adjusting the value of the "subdivision level" parameter. The larger the value, the more times the wrap 220 will be subdivided and the higher the sampling of the limit subdivision surface. FIGS. 4A and 4B illustrate the effect of the value of the subdivision level parameter. FIGS. 4A and 4B each illustrate a polygonal mesh wrap 220, a NURBS sphere model 210, and a subdivision mesh 400 formed from the wrap 220. The subdivision mesh 400A in FIG. 4A was formed from a wrap 220 using a lower subdivision level parameter value than was used to form the subdivision mesh 400B in FIG. 4B. As a result, the subdivision mesh 400B has more binding sites and will provide a better deformation resolution.

Figure 5A:
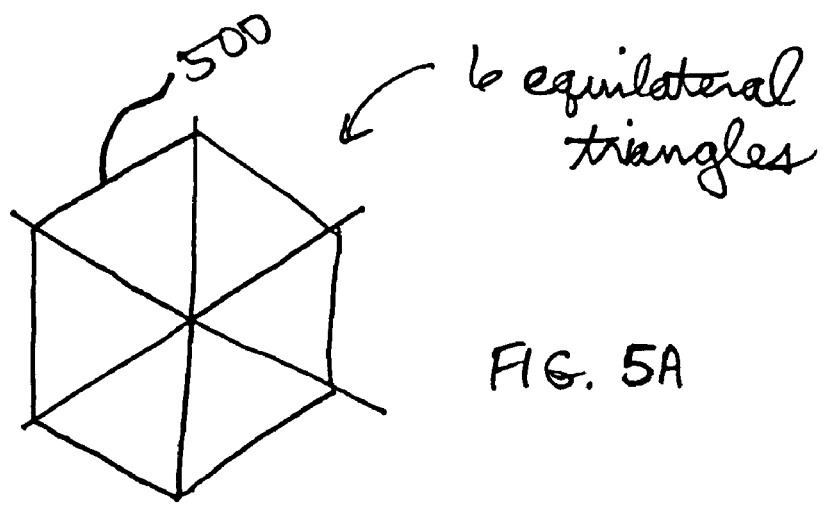
FIGS. 5A-5C illustrate subdivision using the Loop algorithm.
Figure 5B:
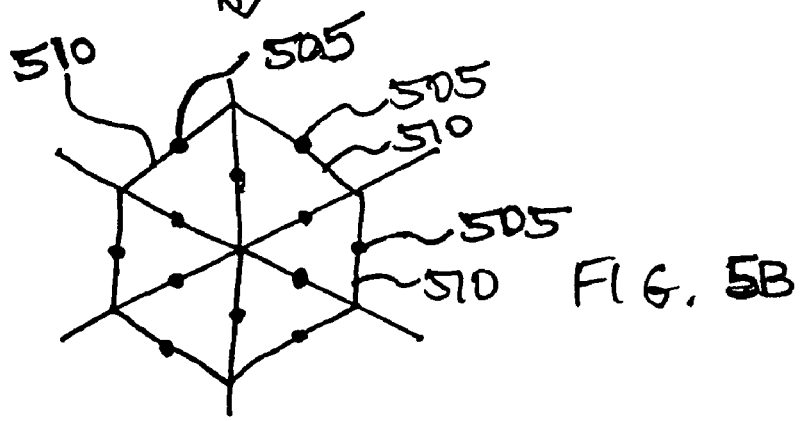
Figure 5C:
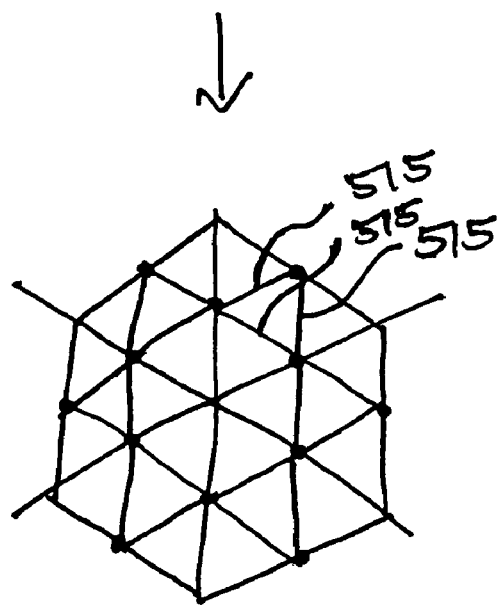

There are many methods for calculating a subdivision surface. FIGS. 5A-5C illustrate subdivision using the Loop algorithm. In order to use this algorithm, the original surface 500 should be a triangular mesh. If the wrap 220 that was input into the polywrap deformation engine 200 is not a triangular mesh, the wrap 220 can be converted into a triangular mesh by using a triangulation algorithm such as the Delaunay algorithm. The Delaunay algorithm is further described in "Primitives for the Manipulation of General Subdivisions and the Computation of Voronoi Diagrams" by L. Guibas and J. Stolfi, ACM Transactions on Graphics, Vol. 4 No. 2, April 1985, pp. 74-123.

FIG. 5A illustrates an original surface 500 (here, a two-dimensional triangular mesh) before Loop subdivision. In the first step, a new vertex ("edge point") 505 is placed on each original edge 510 in the mesh 500 at a location that is a weighted average. FIG. 5B illustrates the original surface 500 with the new edge points 505. Each original vertex is then moved to a new weighted location based on its original position and the new edge points. Finally, new edges 515 are added to connect each new edge point 505 to its adjacent edge points 505. FIG. 5C illustrates the subdivided surface, which is the original surface 500 with the edge points 505 and new edges 515. The result is that each triangular face in the original mesh 500 divides into four triangular faces. The resulting mesh is then smoothed based on the centroids of the new faces. The Loop algorithm is described further in "Smooth Subdivision Surfaces Based on Triangles" by C. T. Loop, Master's thesis, University of Utah, Department of Mathematics, 1987.

Figure 6A:
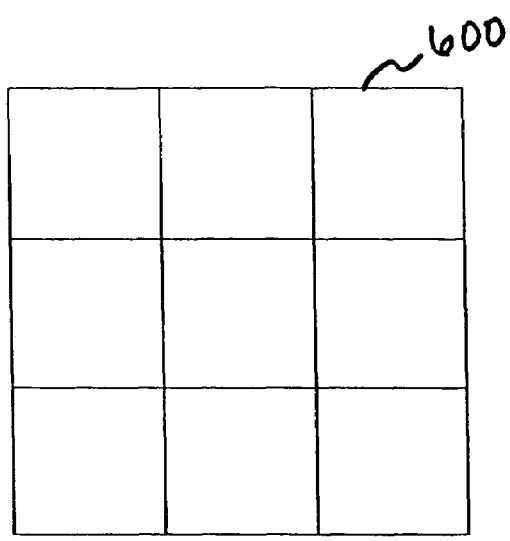
FIGS. 6A-6D illustrate subdivision using the Catmull-Clark algorithm.
Figure 6B:
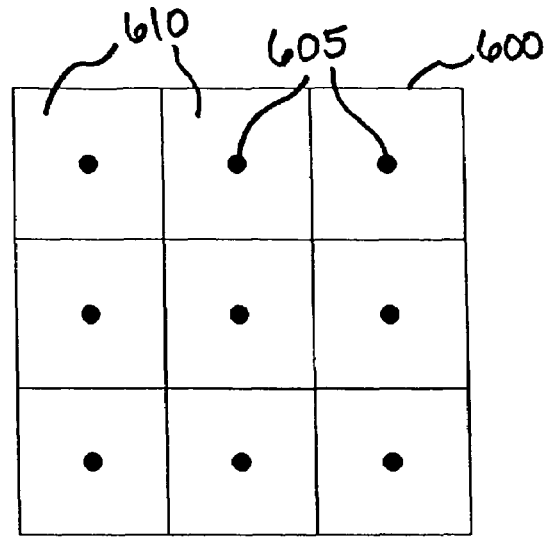
Figure 6C:
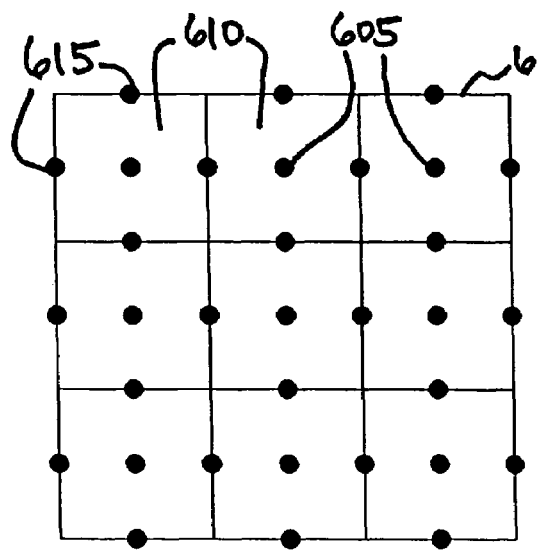
Figure 6D:
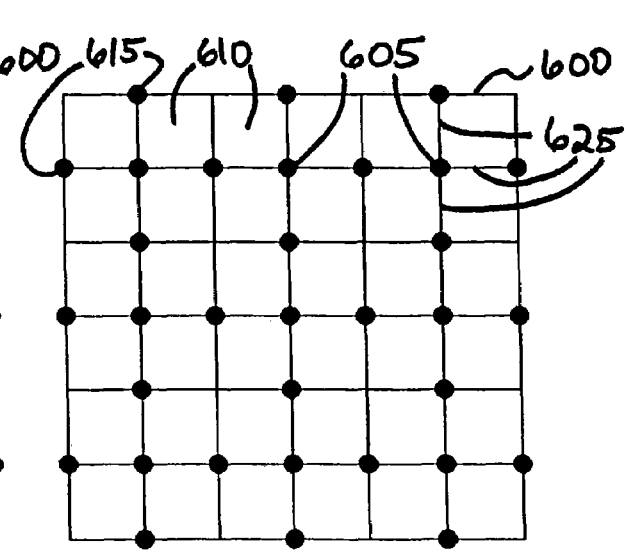

FIGS. 6A-6D illustrate subdivision using the Catmull-Clark algorithm. Unlike the Loop algorithm, the Catmull-Clark algorithm can be used with any arbitrary mesh, as long as it is a manifold. FIG. 6A illustrates an original surface 600 (here, a two-dimensional square mesh) before Catmull-Clark subdivision. In the first step, a new vertex ("face point") 605 is placed at the center of each face 610 in the original surface 600. FIG. 6B illustrates the original surface 600 with the new face points 605. Then, a new vertex ("edge point") 615 is placed on each original edge 620 in the mesh 600 at a location that is a weighted average of the center of the edge 620 and the surrounding new face points 605. FIG. 6C illustrates the original surface 600 with the face points 605 and the new edge points 615. New edges 625 are then added to connect each new edge point 615 to its adjacent face points 605. Each vertex in the original surface 600 is then placed at a new position that is a weighted average based on the vertex's surrounding new face points 605 and new edge points 615. FIG. 6D illustrates the subdivided surface, which is the original surface 600 with the face points 605, edge points 615, and new edges 625. The result is that each square face 610 in the original mesh 600 divides into four square faces. The resulting mesh is then smoothed based on the centroids of the new faces. The Catmull-Clark algorithm is described further in "Recursively Generated B-Spline Surfaces on Arbitrary Topological Meshes" by E. Catmull and J. Clark, Computer-Aided Design, 10(6), pp. 350-355, November 1978.

Instead of using a polygonal mesh wrap 220 as the binding domain for the model 210, as in the prior art, polywrap deformation engine 200 uses a subdivision surface as the binding domain. Recall that traditional wrap deformation, where a model 210 is bound to a polygonal mesh wrap 220, introduces discontinuities into the model 210 because of the significant difference between the resolution of the wrap 220 and the resolution of the model 210. Unlike polygonal meshes, subdivision surfaces have arbitrarily high resolutions. Thus, when a high-resolution model 210 is wrap deformed by a subdivision surface, fewer discontinuities are introduced into the model 210.

However, a subdivision surface is generally not deformed directly. Recall that a subdivision surface is calculated based on a lower-resolution mesh. Thus, polywrap deformation engine 200 calculates a subdivision mesh 400 based on the wrap 220 and then binds the model 210 to the subdivision mesh 400. The subdivision mesh 400 thereby acts as a proxy, conveying deformation information from the wrap 220 to the model 210. Since the subdivision mesh 400 is calculated based on the wrap 220, any deformation in the wrap 220 is automatically propagated to the subdivision mesh 400. The deformation of the subdivision mesh 400 is then propagated to the model 210 because of the binding between the model 210 and the subdivision mesh 400.

In other words, discontinuous changes in the wrap 220 get transformed into smooth and continuous changes on the subdivision surface. As a result, binding a model 210 to a subdivision surface and then deforming the subdivision surface does not introduce as many discontinuities into the model 210. The result is that fewer discontinuities are introduced into the model 210 during the wrap deformation process.

As discussed above, the closer in resolution the model and subdivision mesh are, the fewer discontinuities are introduced during the deformation process. When there is a large difference between the resolution of the wrap and the resolution of the model, it is beneficial to use a high subdivision level to increase the resolution of the subdivision mesh in order to obtain a more accurate binding. If the resolution difference is small, then a low subdivision level should be sufficient.

Figure 7:
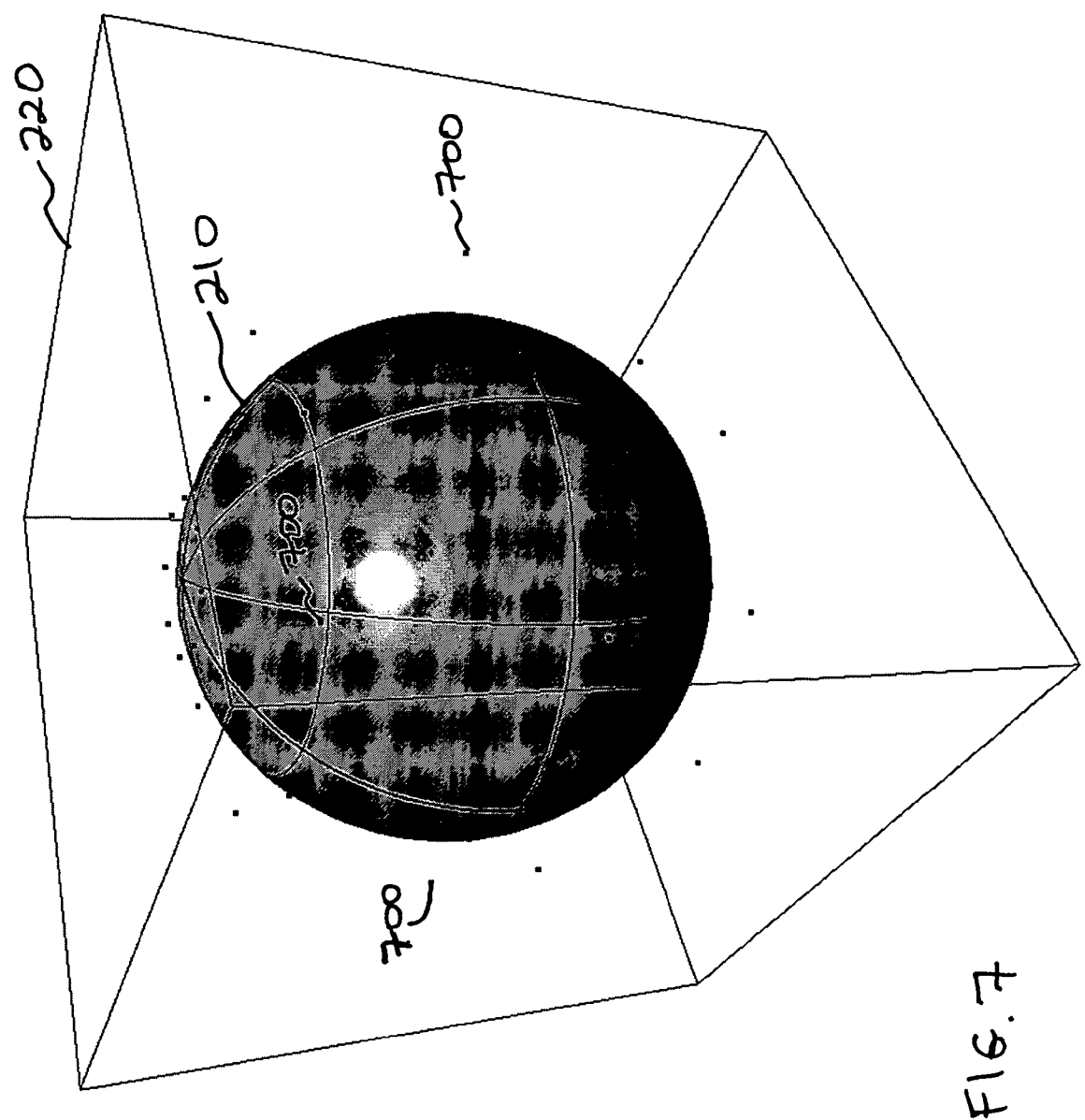
FIG. 7 illustrates a polygonal cube mesh surrounding a NURBS sphere model.

For simplicity purposes, the invention will be described in an embodiment for deforming a NURBS model 210, for example a sphere, using a polygonal cube mesh as a wrap 220. However, the invention may be used to deform a model of any shape or to deform groups of shapes. Similarly, the wrap may be any shape. FIG. 7 illustrates a polygonal cube mesh surrounding a NURBS sphere model. FIG. 7 also illustrates several CVs 700 of the model 210.

When method 300 begins, a model 210 and a wrap 220 have been input into the polywrap deformation engine 200. The first step of method 300 is to calculate 310 a subdivision mesh based on the wrap 220, using any of the methods discussed above. In general, Catmull-Clark subdivision is helpful when deforming NURBS models, since Catmull-Clark subdivision surfaces and NURBS are similar in topology. Loop subdivision is helpful when deforming cloth simulations, since cloth and other dynamic simulations frequently use triangulated meshes, which have a similar topology to Loop subdivision surfaces. Although the polygonal cube mesh has discontinuities on its surface, the subdivision algorithm transforms it into a smooth, continuous surface (in the limit). Since the vertices in the subdivision mesh are located in the limit subdivision surface, artifacts deriving from the finite subdivision of the polygonal mesh are avoided.

Figure 8:
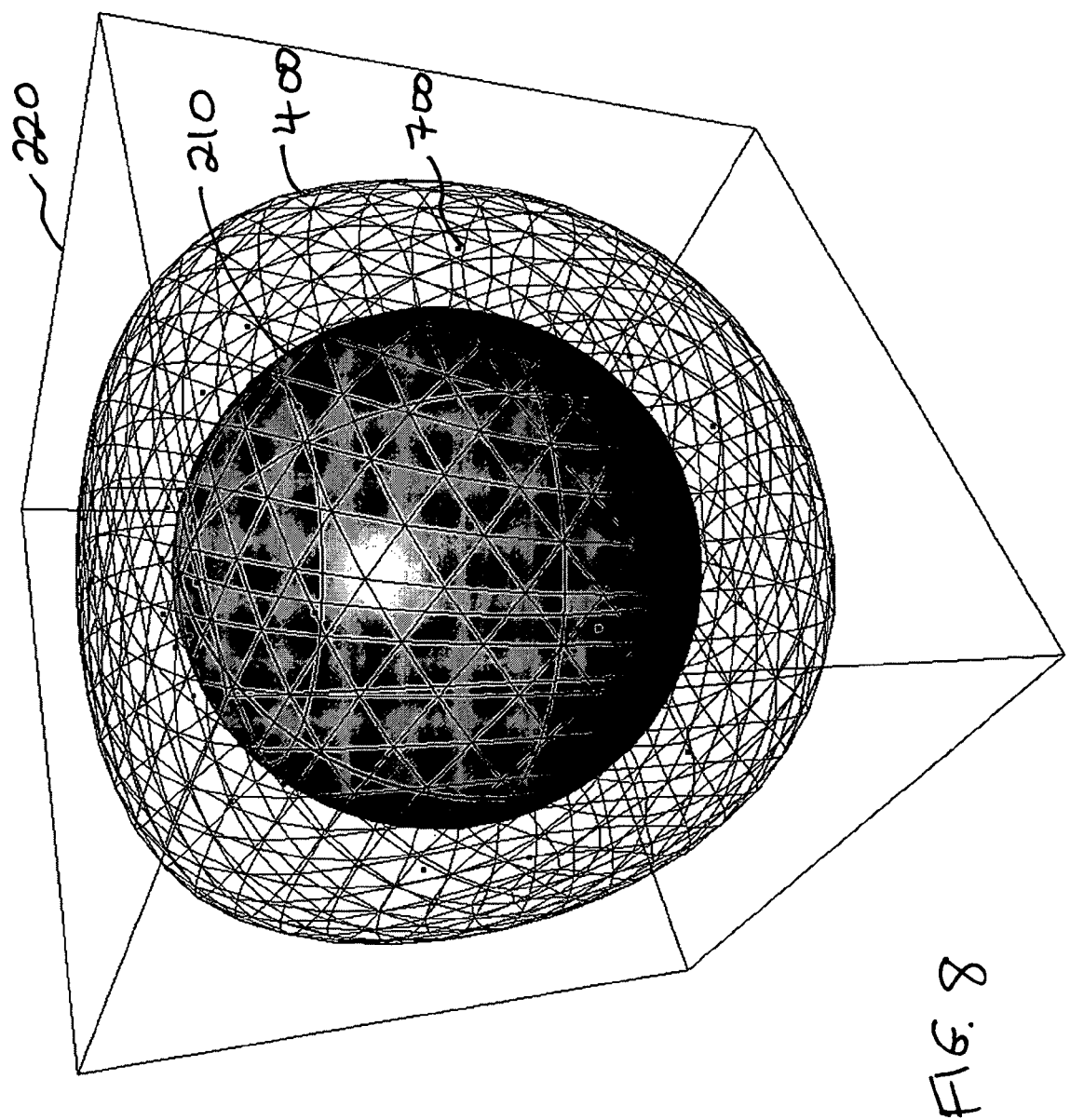
FIG. 8 illustrates a polygonal cube mesh surrounding a NURBS sphere model and the cube mesh's subdivision mesh, calculated using the Loop algorithm.

FIG. 8 illustrates a polygonal cube mesh surrounding a NURBS sphere model and the cube mesh's subdivision mesh, calculated using the Loop algorithm. Once the deformation engine 200 has calculated 310 the subdivision mesh 400 based on the wrap 220, the polywrap deformation engine 200 binds 320 the model 210 to the subdivision mesh 400 (the binding domain). The binding domain comprises a number of binding sites to which the CVs 700 of the model 210 are bound. Since the subdivision mesh 400 is a finite resolution representation of the subdivision limit surface, there are a finite number of binding sites on the subdivision mesh 400. In one embodiment, the number of binding sites on the subdivision mesh 400 is controlled by the subdivision level parameter discussed above.

Each CV 700 on the model 210 is bound to one binding site on the subdivision mesh. Alternatively, one CV 700 could be bound to more than one binding site 900, as long as a normalized weighted averaging of the binding sites on the subdivision surface were defined. In one embodiment, a CV 700 is bound to the closest binding site; however, many other methods of binding are also possible. Since a CV of a model 210 is bound to a binding site on the subdivision mesh 400, the link between them (and thus the link between their deformations) is surface-based, not volume-based as it is in some prior art.

Figure 9:
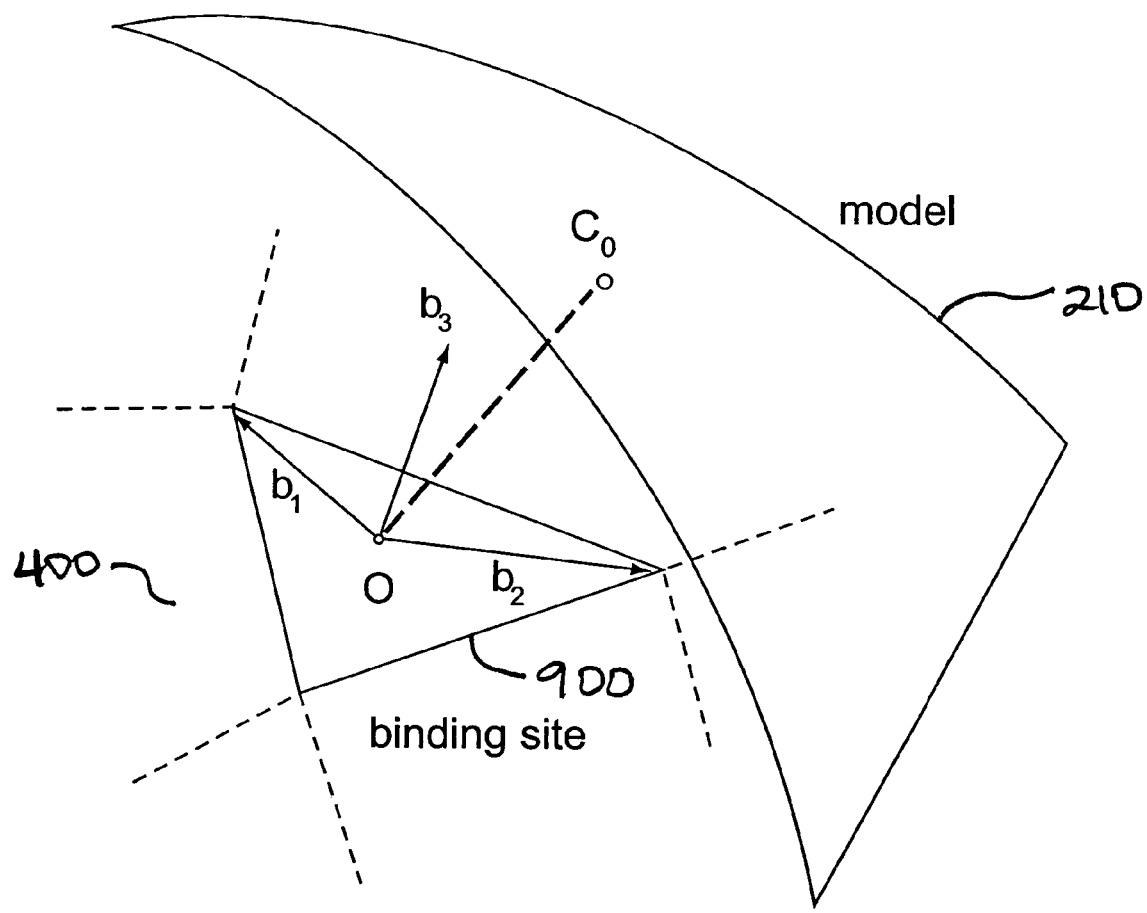
FIG. 9 illustrates a binding between a model and a subdivision mesh formed using the Loop algorithm.

Which part of the subdivision mesh 400 is used as the actual binding site depends on how the subdivision mesh 400 is calculated. FIG. 9 illustrates a binding between a model and a subdivision mesh formed using the Loop algorithm. Here, a binding site 900 is defined as one triangular face of the subdivision mesh 400. Each CV ($C_i$) on the model 210 is bound to the closest binding site 900 of the subdivision mesh 400. In order to determine to which binding site 900 a particular CV 700 is bound, a local reference frame of coordinates is created. Many choices exist for the local reference frame. In one embodiment, the local reference frame comprises an origin point O (the center of reference) and three vectors $b_1$, $b_2$, $b_3$. While O can be any point that lies on the subdivision surface, in one embodiment, O is the barycenter (center of gravity) of the binding site 900. Vector $b_3$ is normal to the subdivision surface and intersects the subdivision surface at O. Vector $b_3$ is calculated by taking the cross-product of vector $b_1$ and vector $b_2$. These two vectors go from O to the two nearest consecutive vertices of the binding site 900. If the triangle of the binding site 900 is degenerate, then that binding site is not used. In FIG. 9, control vertex $C_0$ is bound to the barycenter O of the binding site 900.

Figure 10:
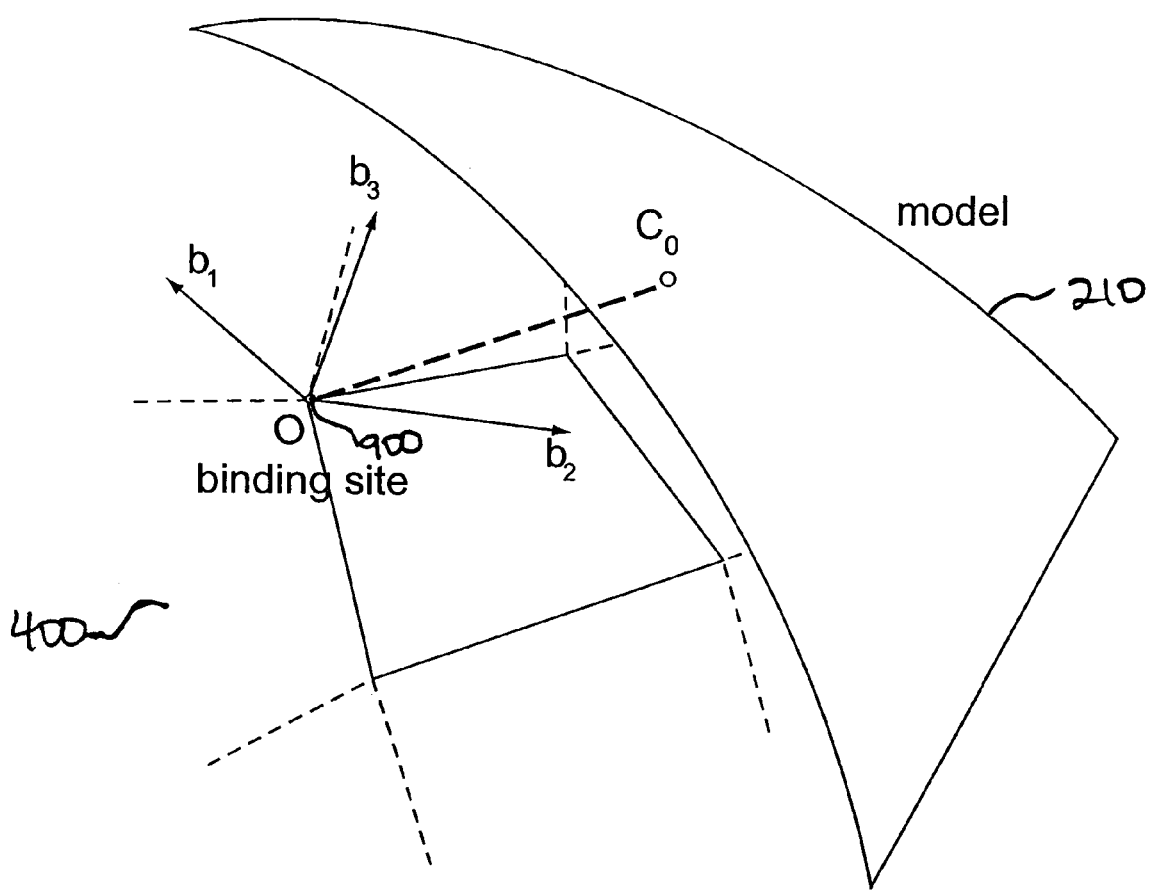
FIG. 10 illustrates a binding between a model and a subdivision mesh formed using the Catmull-Clark algorithm.

FIG. 10 illustrates a binding between a model and a subdivision mesh formed using the Catmull-Clark algorithm. In this embodiment, a binding site 900 is defined as a vertex of the limit subdivision surface. However, many other methods of binding are also possible. Each CV ($C_i$) on the model 210 is bound to the closest vertex of the subdivision mesh 400. Vectors $b_1$ and $b_2$ are tangent vectors to the limit surface at O. Vector $b_3$ is again defined as the cross-product of vectors $b_1$ and $b_2$.

Once the binding site's reference frame $\{O; b_1, b_2, b_3\}$ has been established, the binding projection coordinates $\{x_i, y_i, z_i\}$ of a CV ($C_i$) on the model can be determined. The binding projection coordinates are the components of the projection of the vector O-$C_i$ onto the binding site 900. The binding procedure is repeated for each CV in the model 210. Once a binding has been calculated for each CV in the model 210, the result is a set of local frames of coordinates (one for each binding site) and the corresponding projections of these coordinates to the model's control vertices.

Figure 11:
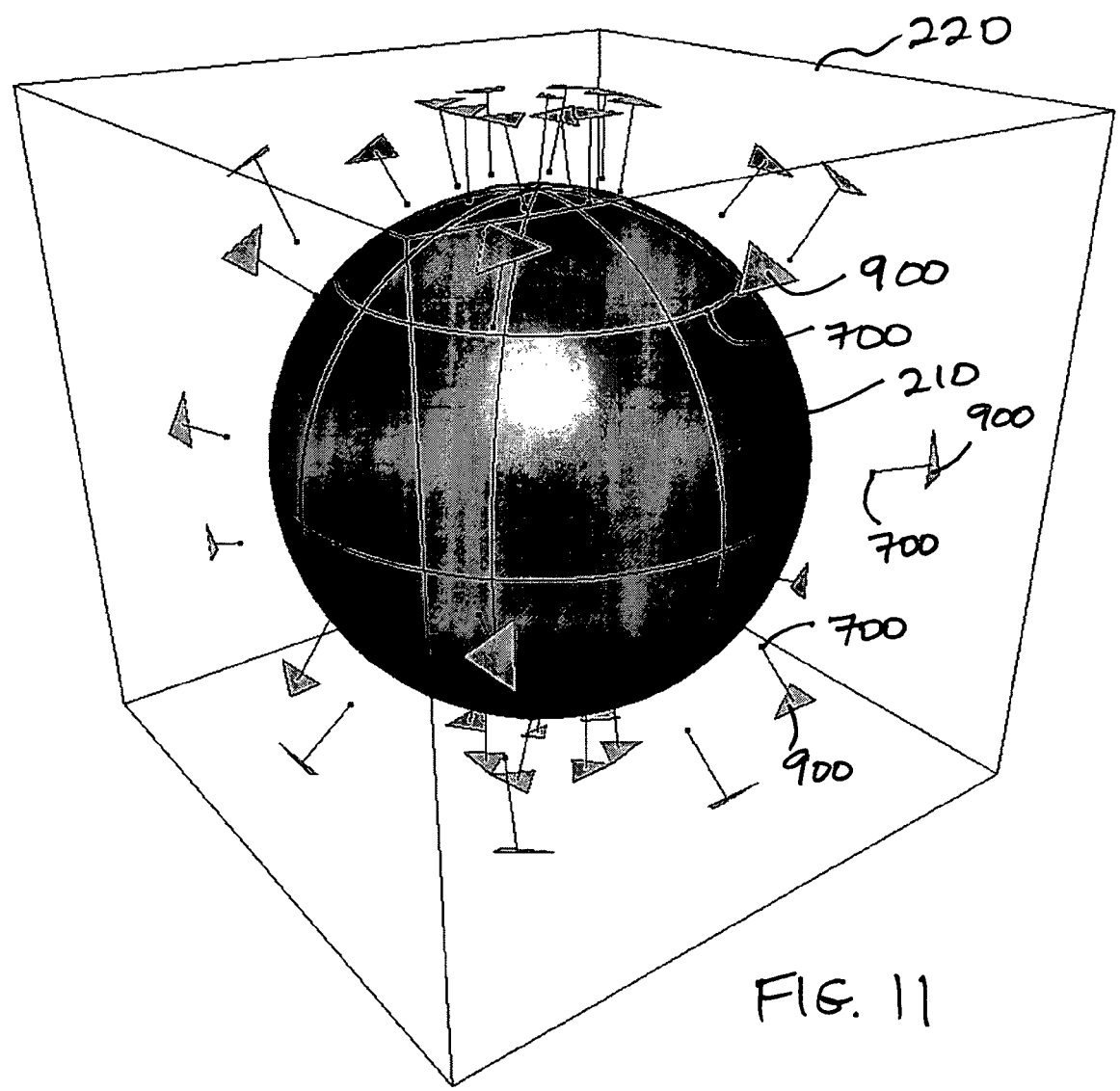
FIG. 11 illustrates the wrap, model, and portions of the subdivision mesh of FIG. 8 in addition to the bindings between the model and the subdivision mesh.
Figure 12:
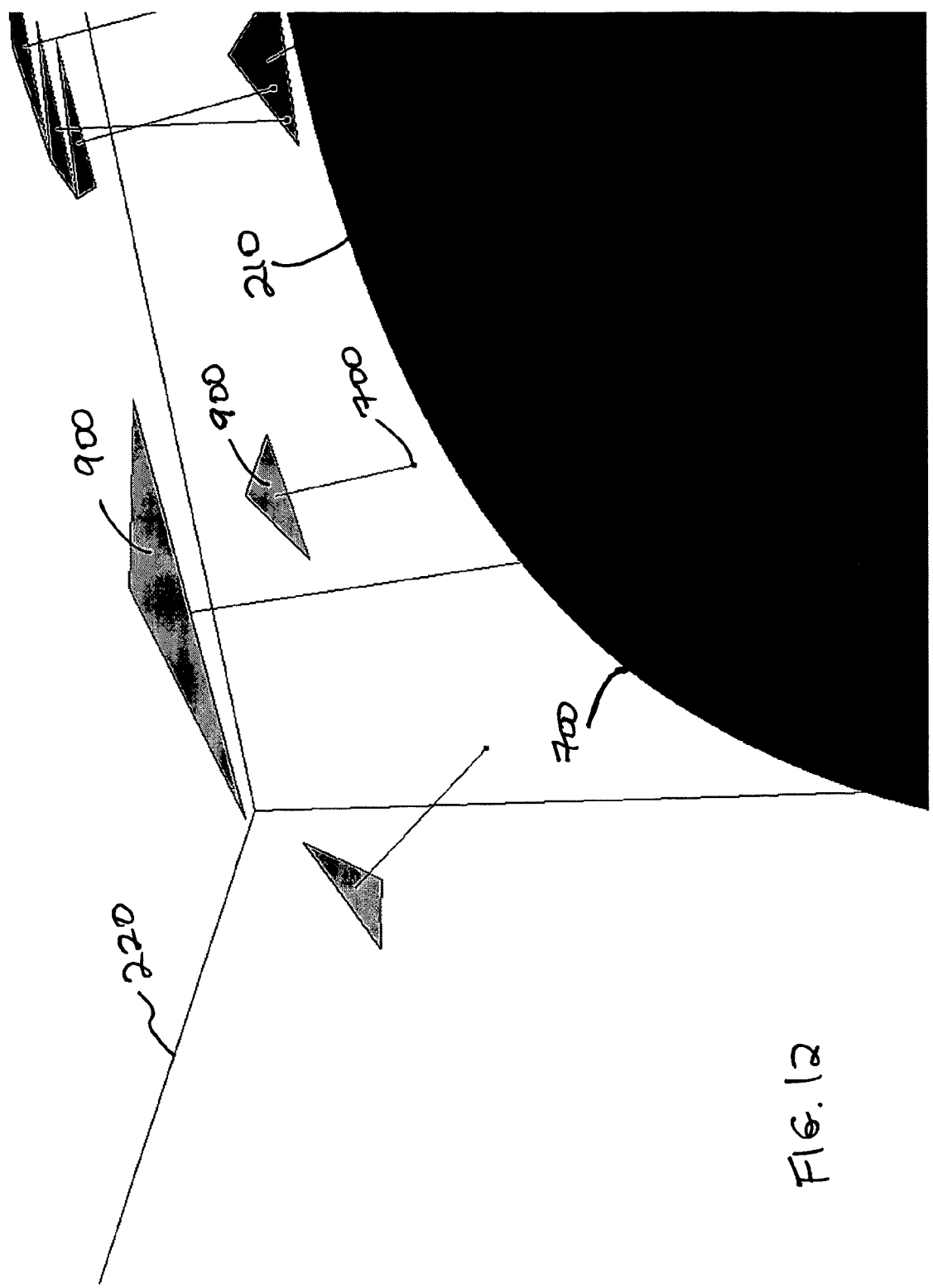
FIG. 12 illustrates an enlarged view of a portion of FIG. 11.

FIG. 11 illustrates the wrap, model, and portions of the subdivision mesh of FIG. 8 in addition to the bindings between the model and the subdivision mesh. Only binding sites 900 that have been bound to CVs 700 on the model 210 are shown. In this embodiment, each CV on the model was bound to the binding site that contained the nearest barycenter to the CV. FIG. 12 illustrates an enlarged view of a portion of FIG. 11.

After the polywrap deformation engine 200 has calculated the default bindings between the model 210 and the subdivision mesh 400, a user can manually edit the bindings to adjust the deformations more precisely in a specific area. Wrap deformers have trouble with bindings located in tight corners, such as between two fingers or at the corners of mouths and eyes. In these areas, it is often useful to edit the bindings of a few CVs of the model 210. This gives the user more control over the binding mechanism between the model 210 and the subdivision mesh 400. The user can therefore rebind the CVs of the model 210 to different locations, and the deformation engine 200 will automatically determine new projection coordinates.

Once the bindings between the model 210 and the subdivision mesh 400 have been determined, the binding projection coordinates for each CV 700 of the model 210 are stored 330. These coordinates are later used to transfer deformations of the wrap 220 to the model 210, as will be discussed below.

After the binding projection coordinates have been stored 330, the next step is to deform 340 the wrap 220. The wrap 220 can be deformed 340 in many ways, by either directly moving its vertices or applying other existing deformers. Since there is only one wrap 220 associated with the deformation engine 200, all changes applied to the wrap 220 transfer a deformation directly to the model 210. Similarly, any editing of the wrap 220 that causes a change of the topology of the subdivision mesh 400, such as face extrusion and insertion and deletion of edges, triggers a "rebinding" of the model 210 to the wrap 220. Essentially, the deformation engine 200 detects the topology change, calculates a new subdivision surface and new binding sites, and reconnects the current state of the model 210 to the subdivision binding domain. In prior art software, the wrap 220 has two copies, one for the "base" wrap, which defines the binding properties, and another for the "editable" binding wrap. However, prior art software does not support topological changes to the wrap 220. Users can change only the vertex positions of the "editable" wrap 220.

After the wrap 220 has been deformed 340, the next step is to propagate these changes to the subdivision surface by recalculating the subdivision surface based on the deformed wrap 220. No matter how the original vertices of the wrap 220 are deformed, the wrap's subdivision surface always remains smooth and continuous. The recalculation of the subdivision surface is very fast, much faster than the partitioning of space in three-dimensional cells that is used by prior art free-form deformers. FIG. 13 illustrates the polygonal cube mesh, the NURBS sphere model, and the cube mesh's subdivision mesh of FIG. 8 after deformation of the polygonal cube mesh.

Recall that the first time that the subdivision surface was calculated (step 310), the next step was to bind the model 210 to the subdivision mesh 400. At this point, however, the model 210 has already been bound to the subdivision mesh 400, and those binding projection coordinates have been stored. The idea here is to use the recalculated subdivision surface and the stored bindings to move the CVs 700 of the model 210. Thus, the next step is to deform the model 210 by calculating 360 new positions of the control vertices 700 of the model 210. As mentioned above, this calculation is based on the recalculated subdivision surface (and its associated subdivision mesh 400), the stored binding projection coordinates, and any binding parameters.

Since the recalculated subdivision surface has the same resolution as the original subdivision surface, it has the same number of binding sites 900. However, the reference frame $\{O; b_1, b_2, b_3\}$ of each binding site 900 is affected, since the location of O and the orientation of $b_1, b_2, b_3$ are translated due to the deformation. In contrast, the binding projection coordinates of each CV 700 of the model 210 remain constant. The original binding coordinates and the new reference frame, along with the binding parameters discussed below, enable the prediction of the new location of a CV 700 on the model 210.

Binding parameters may include, for example, radius of influence, weighting, and blending. While binding parameter values are originally set for a wrap 220, these values are propagated to the subdivision surface based on the wrap 220. Since the subdivision surface is continuous, the parameter value changes over the subdivision surface are also continuous, and this continuity extends to the model 210. Parameter continuity in the model enables a smoother animation of the underlying model 210, thereby creating a more nuanced performance by the animated character. Thus, usage of a subdivision surface enables both positional continuity and continuity in binding parameters.

The radius of influence parameter affects a binding site 900, and its value can be set by default or specified by a user. The value of the radius of influence parameter indicates which CVs 700 of the model 210 can be bound to the binding site 900. Any CV 700 that is farther away from the binding site 900 than the parameter value will not be bound to the binding site 900.

Figure 14A:
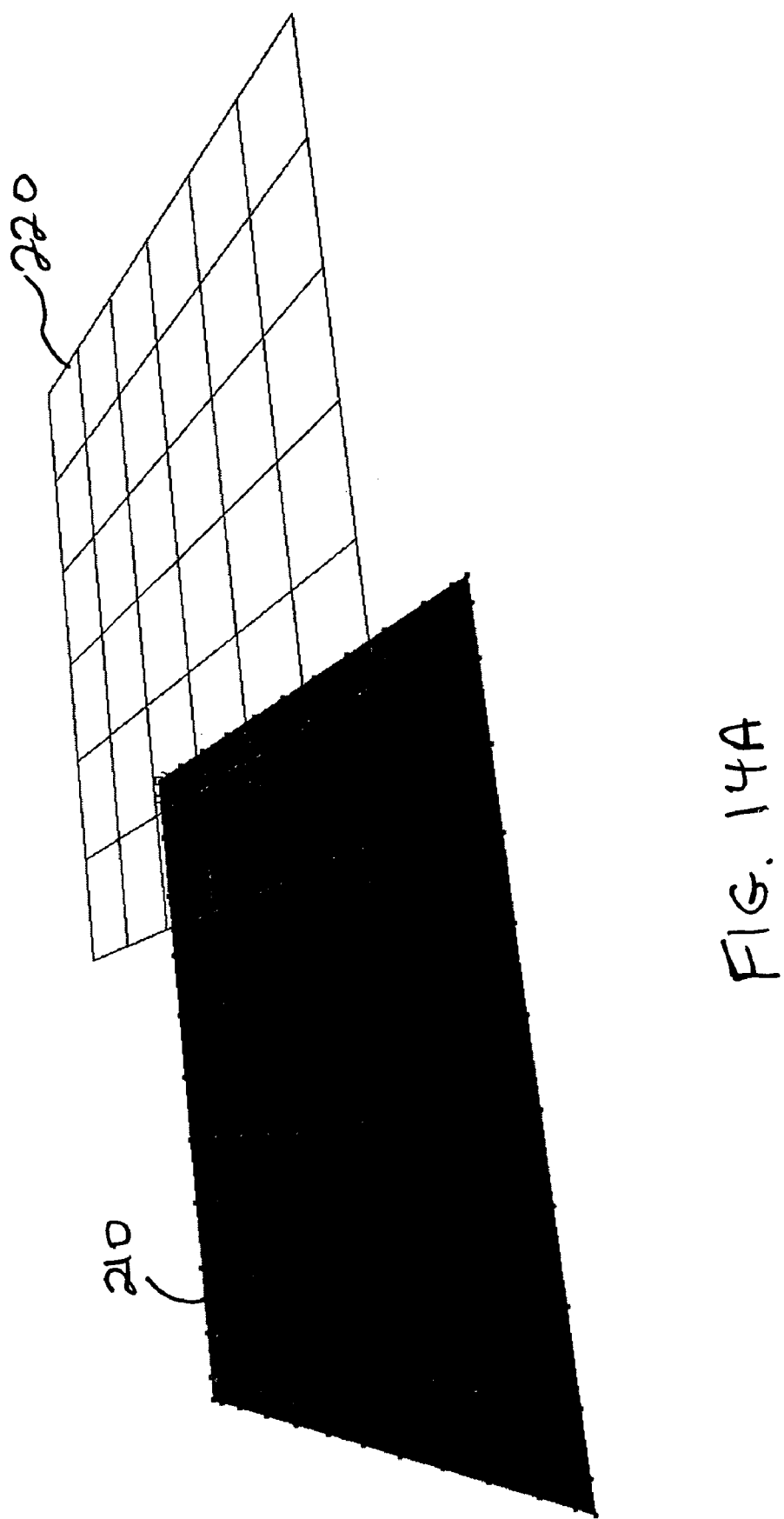
FIGS. 14A, 14B, and 14C illustrate the effect on a model of the value of the radius of influence binding parameter.
Figure 14B:
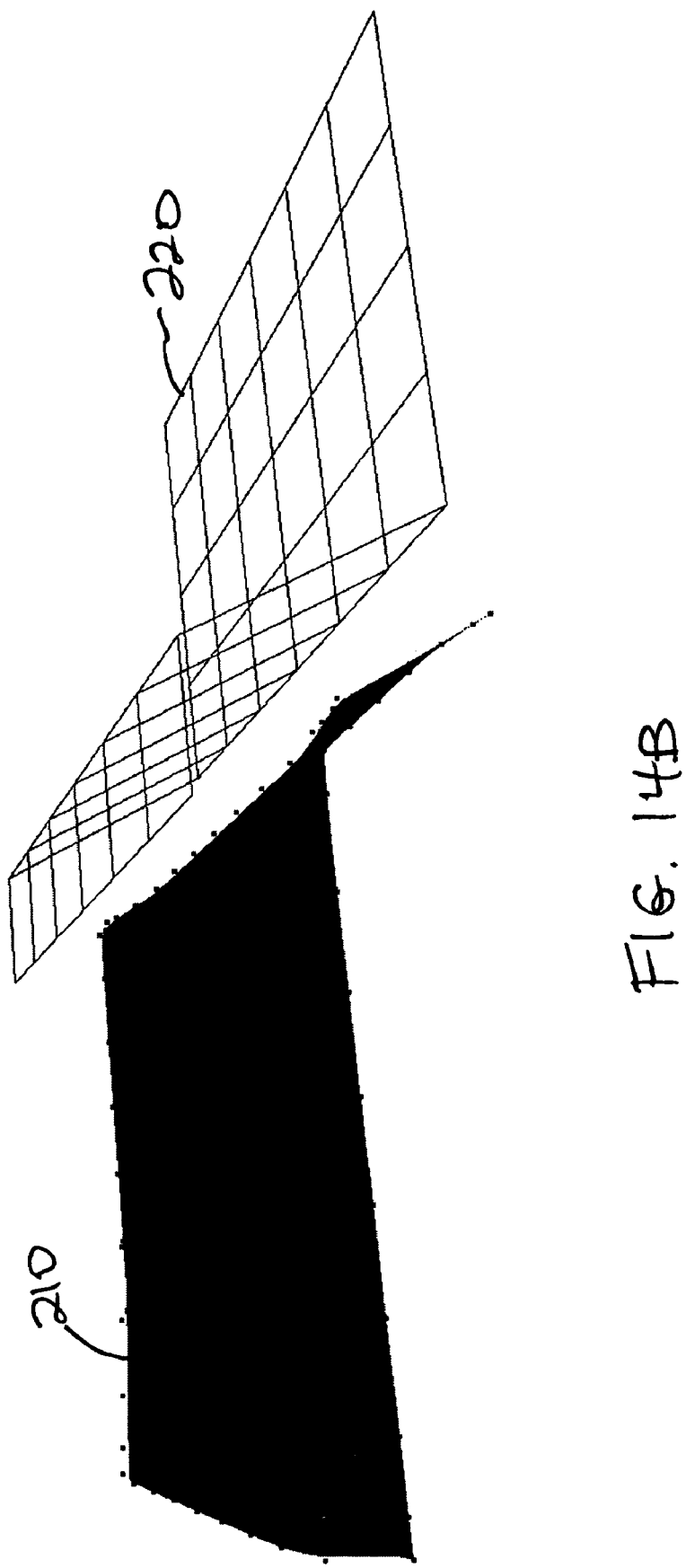
Figure 14C:
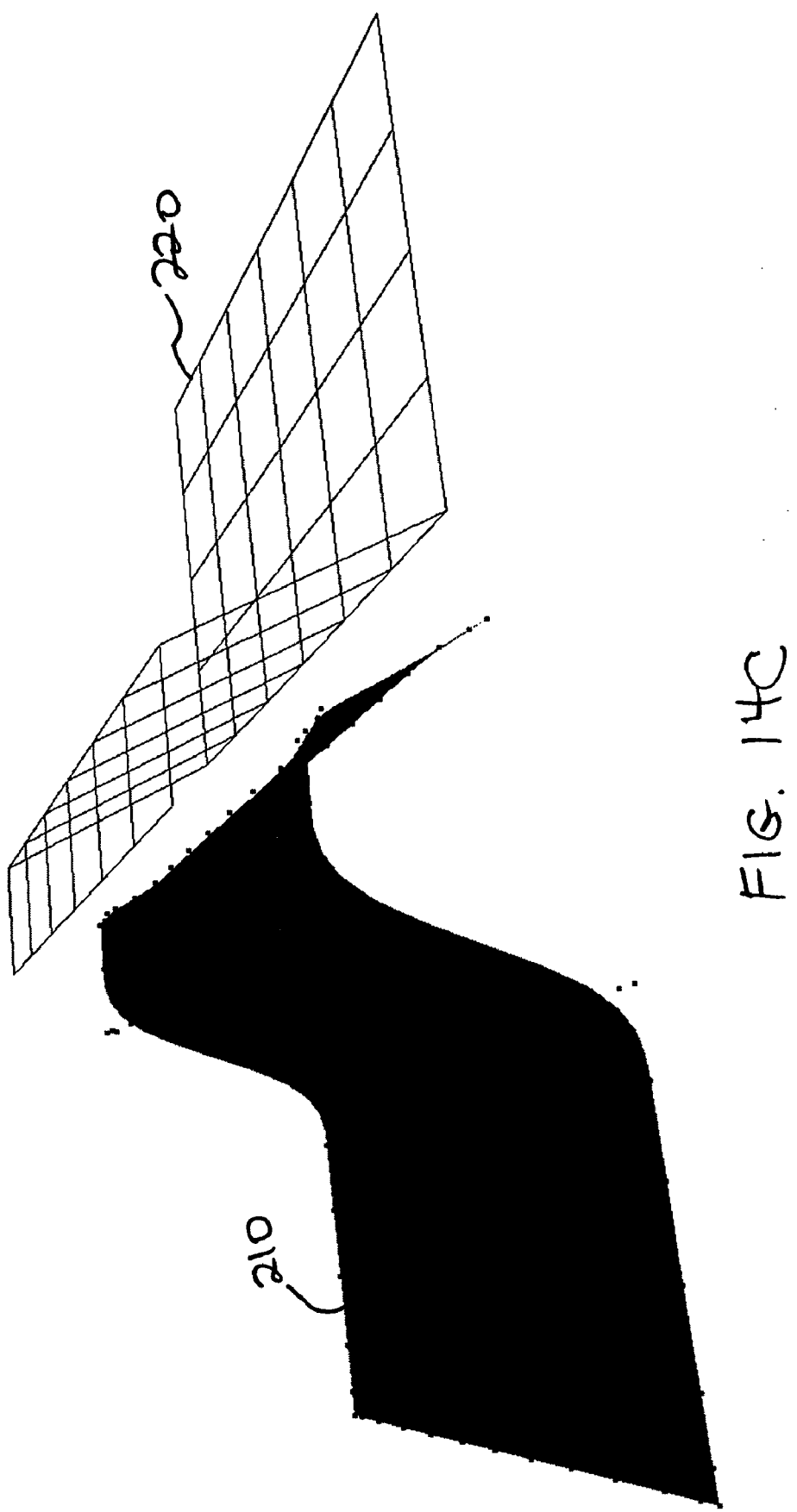

FIGS. 14A, 14B, and 14C illustrate the effect on a model of the value of the radius of influence binding parameter. FIGS. 14A, 14B, and 14C each illustrate a polygonal plane mesh 220 and a NURBS plane model 210. In FIG. 14A, the wrap 220 and the model 210 are in their original positions. In FIGS. 14B and 14C, two rows of the wrap 220 have been translated vertically, resulting a deformation of the model 210. The deformation of the model 210 in FIG. 14B was formed from a wrap 220 having a higher radius of influence binding parameter value than the wrap 220 used to deform the model 210 in FIG. 14C. As a result, the deformation in the model 210 in FIG. 14C is more localized.

Figure 15A:
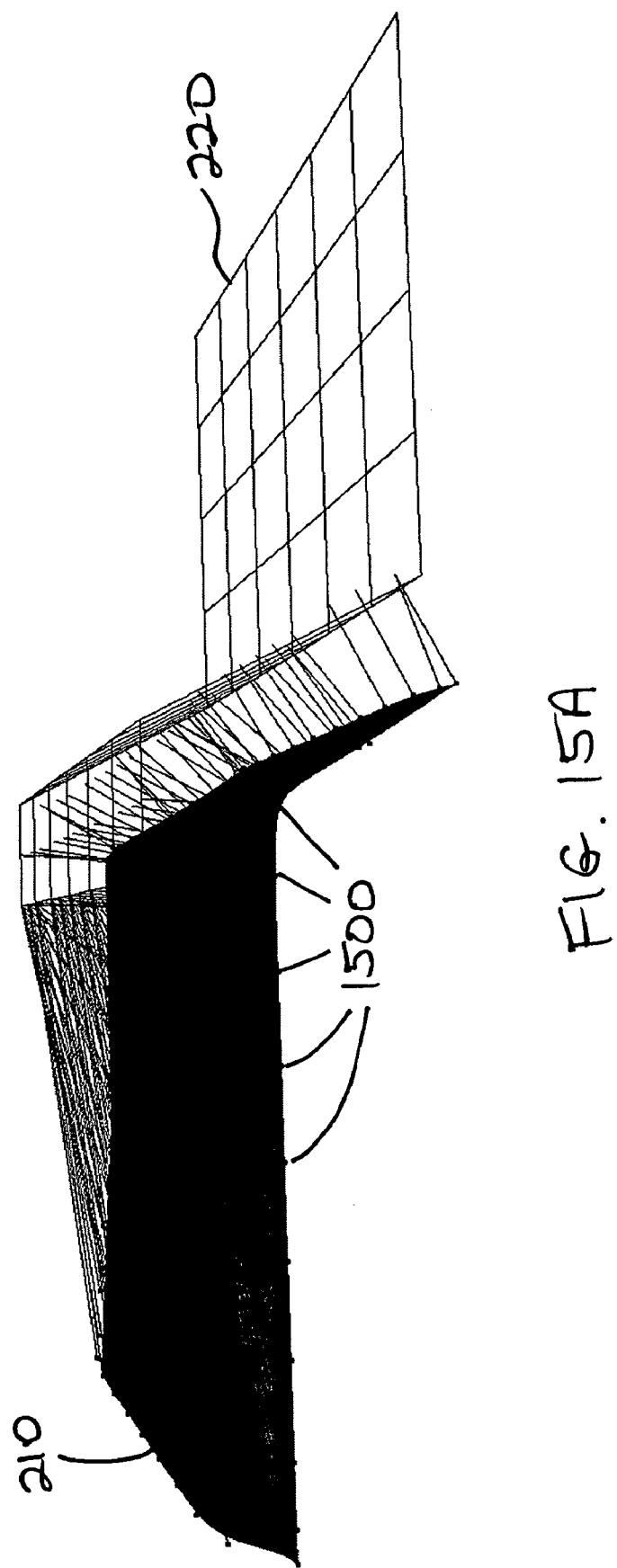
FIGS. 15A and 15B illustrate the effect on the bindings between a wrap and a model of the value of the radius of influence binding parameter.
Figure 15B:
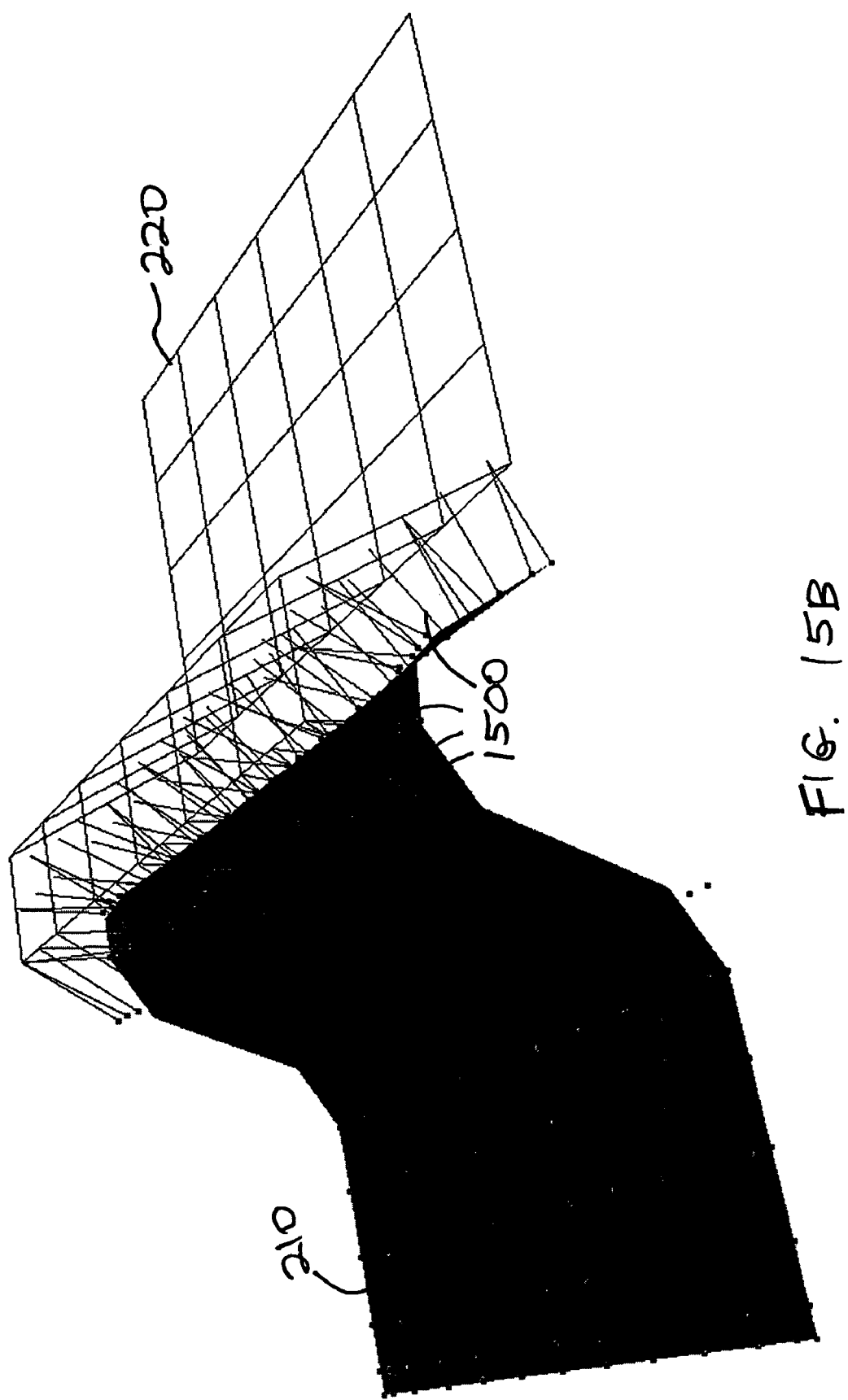

The radius of influence parameter changes the bindings between the wrap 220 and the model 210, as shown more clearly by FIGS. 15A and 15B. FIGS. 15A and 15B illustrate the effect on the bindings between a wrap and a model of the value of the radius of influence binding parameter. FIGS. 15A and 15B illustrate the same wraps 220 and models 210 as in FIGS. 14B and 14C, respectively, as well as the bindings 1500 between the wraps 220 and models 210. As illustrated, the bindings 1500 in FIG. 15A extend further from the wrap 220 to more distant parts of the model 210 than do the bindings 1500 in FIG. 15B.

Another parameter is rate of deformation, also known as weighting. In general, all points in a wrap 220 deform the underlying model 210 with the same strength. However, a user may want to vary how strongly a given control vertex or group of control vertices of the wrap 220 affects (pushes or pulls) the model 210. This can be achieved by assigning a weight to the vertex of the wrap 220. The greater the weight, the stronger the effect of the control vertex on the model 210. If weights are assigned to the wrap 220, the wrap 220 can be used again with a different model 210 to produce the same deformation effect. In order to use the wrap 220 with a different model 210, the binding between the subdivision mesh 400 and the new model 220 is first established by the method described above (step 320). Prior art software does not support placing weights on a wrap 220. Instead, weights are placed directly on a model 210.

The blending parameter determines to what extent a CV in a wrap 220 is influenced by its current position when the wrap 220 is subjected to a deformation. If the blending parameter value is low, the new position of the CV will be based mainly on its previous (neutral) position, with some influence from its calculated pure deformed position (e.g., via a linear interpolation between the two positions). If the blending parameter value is high, the new position of the CV will be based mainly on its calculated pure deformed position, with some influence from its previous (neutral) position.

Other binding parameters may include elasticity of deformation, color, and mass or inertia (to affect the model's dynamic behavior).

Once the new positions of the CVs 700 on the model 210 have been calculated 360, the computer recalculates the model 210 using these new positions, as discussed above with reference to manual manipulation of CVs.

A user can also request a rebinding of a model to a subdivision surface. Rebinding comprises recalculating the subdivision mesh 400 (if needed), rebinding the model 210 to the subdivision mesh 400, and storing the binding projection coordinates. A user may want to rebind a model 210 if, for example, the user has changed the value of the subdivision level parameter, edited the wrap 220 (e.g., by adding a face or removing an edge), or changed the value of a binding parameter. Alternatively, a user may want to replace the original wrap 220 or the original model 210 with a different wrap or model, respectively.

The embodiments described above use one wrap 220. However, it is sometimes useful to use two wraps 220: a reference wrap to which a model 210 is bound and an editable (or "live") wrap that provides current binding site information to use when updating the CVs of a model 210. The editable wrap is identical to the reference wrap except for the locations of its coordinates. In this embodiment, two subdivision surfaces are computed. The subdivision surface computed from the reference wrap is used to compute binding sites 900, while the subdivision surface computed from the editable wrap is used to determine the current locations of the binding sites 900 for each CV of the model 210. The binding frames of coordinates from the latter subdivision surface and the binding projection coordinates from the former subdivision surface are used to calculate the new coordinates of the CVs of the model 210.

In one embodiment, both the reference wrap and the editable wrap can be moved and edited simultaneously. Moving the reference wrap displaces the area of influence along the model 210, having binding sites 900 slide through the model 210. Moving the editable wrap introduces local deformations to the model 210.

Figure 16:
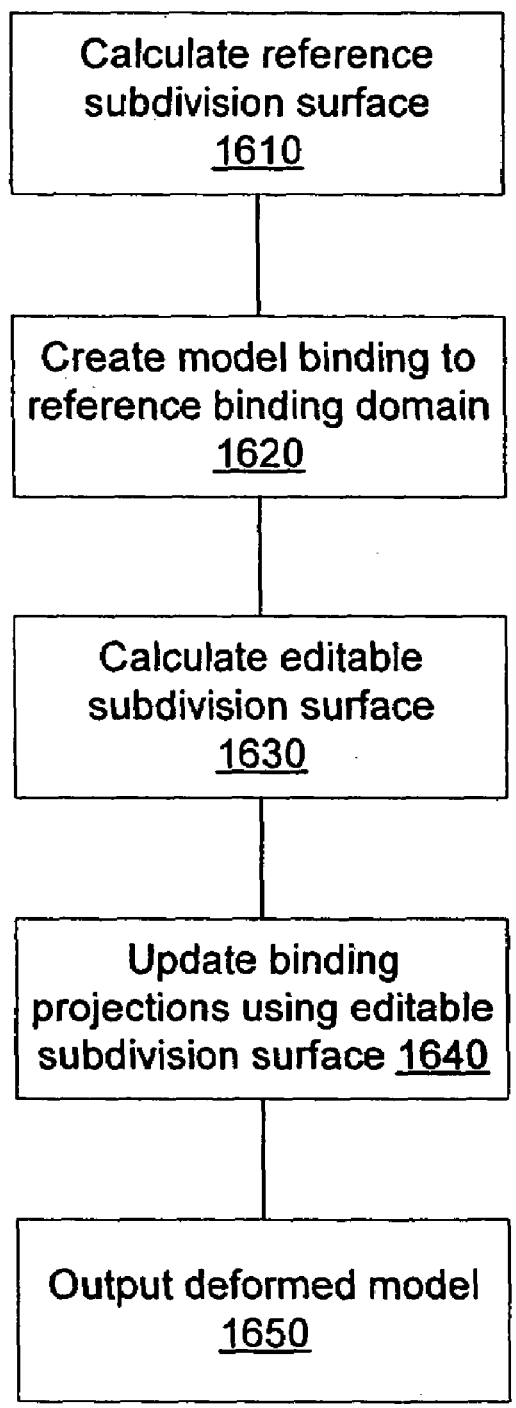
FIG. 16 illustrates a flowchart of a method for wrap deforming a model according to another embodiment of the invention.

FIG. 16 illustrates a flowchart of a method for wrap deforming a model according to another embodiment of the invention. In the first step, a subdivision surface is calculated 1610 from the reference wrap. Then, bindings are created 1620 from the model 210 to the subdivision surface calculated in step 1610. A second subdivision surface is then calculated 1630 from the editable wrap. This subdivision surface is then used to update 1640 binding projection coordinates. Finally, the locations of the CVs of the model 210 are calculated, and the deformed model is output 1650.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs, which are stored in computer readable mediums. Furthermore, these arrangements of operations can be equivalently referred to as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "calculating" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be loaded to reside on and be operated from different type of computing platforms.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and illustrations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for deforming a model using a wrap, the method comprising:
   determining a subdivision surface based on the wrap;
   binding the model to the subdivision surface;
   updating the subdivision surface responsive to a change in position of a first control vertex in the wrap;
   determining a new position of a second control vertex of the model responsive to an update of the subdivision surface; and
   storing the new position of the second control vertex of the model.

2. The method of claim 1 further comprising:
   determining a new position for another point of the model based on the new position of the second control vertex of the model.

3. The method of claim 1, further comprising determining a set of binding projection coordinates for a the second control vertex of the model.

4. The method of claim 1 further comprising determining a subdivision mesh, the subdivision mesh being a finite resolution representation of the subdivision surface, and wherein binding the model to the subdivision surface comprises binding the model to the subdivision mesh.

5. The method of claim 4 wherein a level of resolution of the subdivision mesh varies.

6. The method of claim 4 wherein binding the model to the subdivision mesh comprises determining, for the second control vertex of the model, at least one binding site of the subdivision surface, the binding site being one of a vertex of the subdivision mesh and a face of the subdivision mesh.

7. The method of claim 6 wherein the second control vertex of the model is a control vertex that is closest to the intersection of the model and a vector that is orthogonal to the subdivision surface at the binding site.

8. The method of claim 1 wherein binding the model to the subdivision surface comprises determining, for the second control vertex of the model, at least one binding site of the subdivision surface.

9. The method of claim 8 wherein determining, for the second control vertex of the model, at least one binding site of the subdivision surface comprises determining whether the second control vertex is farther away from the binding site than a particular vain, the particular value being associated with the binding site.

10. The method of claim 9 further comprising assigning at least one value to the subdivision surface based on the value associated with the binding site.

11. The method of claim 1 wherein binding the model to the subdivision surface comprises binding the second control vertex of the model to a particular binding site responsive to receiving input from a user.

12. The method of claim 1, further comprising:
   assigning a weight value to the first control vortex of the wrap; and
   assigning a weight value to the subdivision surface based on the weight value assigned to the first control vertex of the wrap wherein determining anew position of the second control vertex of the model is further responsive to a weight value of the subdivision surface.

13. The method of claim 1 wherein the wrap is a polygonal mesh.

14. The method of claim 1 wherein the model comprises a NURB S (Non Uniform Rational B-Splines) model.

15. The method of claim 1 wherein determining a subdivision surface based on the wrap comprises performing Catinull-Clark subdivision on the wrap.

16. The method of claim 1 wherein determining a subdivision surface based on the wrap comprises performing Loop subdivision on the wrap.

17. A computer program product comprising a computer-readable medium containing computer executable program code for performing any one of the methods of claims 1 through 16.

18. A system for deforming a model using a wrap, the system comprising:
   means for determining a subdivision surface based on the wrap;
   means for binding the model to the subdivision surface;
   means for updating the subdivision surface responsive to a change in position of a first control vertex in the wrap; and
   means for determining a new position of a second control vertex of the model responsive to an update of the subdivision surface.

19. The system of claim 18 further comprising:
   means for determining a new position for another point of the model based on the new position of the second control vertex of the model.

20. The system of claim 18 further comprising means for determining a subdivision mesh, the subdivision mesh being a finite resolution representation of the subdivision surface, and wherein binding the model to the subdivision surface comprises binding the model to the subdivision mesh.

21. The system of claim 20 wherein a level of resolution of the subdivision mesh varies.

22. The system of claim 20 wherein binding the model to the subdivision mesh comprises determining, for the second control vertex of the model, at least one binding site of the subdivision surface, the binding site being one of a vertex of the subdivision mesh and a face of the subdivision mesh.

23. The system of claim 22 wherein the second control vertex of the model is a control vertex that is closest to the intersection of the model and a vector that is orthogonal to the subdivision surface at the binding site.

24. A computer-implemented method for deforming a model using a first wrap and a second wrap, the method comprising:
   determining a first subdivision surface based on the first wrap;
   binding the model to the first subdivision surface;
   determining a second subdivision surface based on the second wrap;
   determining a set of binding projection coordinates for a first control vertex of the model;
   updating the set of binding projections responsive to a change in position of a second control vertex in the second wrap;
   determining a new position of the first control vertex of the model responsive to an update of the set of binding projections; and
   storing the new position of the first control vertex of the model.

25. A computer program product comprising a computer-readable medium containing computer executable program code for performing the method of claim 24.

26. A system for deforming a model using a first wrap and a second wrap, the system comprising:

means for determining a first subdivision surface based on the first wrap;

means for binding the model to the first subdivision surface;

means for determining a second subdivision surface based on the second wrap;

means far determining a set of binding projection coordinates for first control vertex of the model;

means for updating the set of binding projections responsive to a change in position of a second control vertex in the second wrap; and means for determining a new position of the first control vertex of the model responsive to an update of the set of binding projections.

27. A deformation system, the system comprising:

a model;

a subdivision surface; and a deformation engine configured to bind the model to the subdivision surface and to determine a new position of a first control vertex of the model responsive to a change of the subdivision surface, wherein the subdivision surface is determined based on a wrap and the subdivision surface changes responsive to a change in position of a second control vertex in the wrap.

28. A computer program product comprising a computer-readable medium containing computer executable program code for;

representing a model;

representing a subdivision surface;

binding the modal to the subdivision surface;

determining a new position of a first control vertex of the model responsive to a change of the subdivision surface, wherein the subdivision surface is determined based on a wrap and the subdivision surface changes responsive to a change in position of a second control vertex in the wrap; and storing the new position of the second control vertex of the model.

* * * * *